United States Patent
Sorbara et al.

(10) Patent No.: US 7,701,893 B2
(45) Date of Patent: Apr. 20, 2010

(54) METHOD AND SYSTEM FOR EFFICIENT DISTRIBUTION OF MULTICAST SERVICES IN A MOBILE NETWORK

(75) Inventors: Davide Sorbara, Turin (IT); Enrico Zucca, Turin (IT)

(73) Assignee: Telecom Italia S.p.A., Milan (IT)

( * ) Notice: Subject to any disclaimer, the term of this patent is extended or adjusted under 35 U.S.C. 154(b) by 602 days.

(21) Appl. No.: 11/596,010

(22) PCT Filed: May 10, 2004

(86) PCT No.: PCT/IT2004/000256

§ 371 (c)(1), (2), (4) Date: Nov. 9, 2006

(87) PCT Pub. No.: WO2005/109728

PCT Pub. Date: Nov. 17, 2005

(65) Prior Publication Data
US 2007/0178916 A1 Aug. 2, 2007

(51) Int. Cl. H04L 12/56 (2006.01)
(52) U.S. Cl. ........................ 370/322; 370/326
(58) Field of Classification Search ............... 370/310, 370/322, 326, 332, 338, 329, 341, 346, 333, 370/349, 394, 474; 455/450, 458, 403; 714/746, 714/748, 749
See application file for complete search history.

(56) References Cited

U.S. PATENT DOCUMENTS

2003/0156573 A1* 8/2003 Tran et al. ................... 370/349

2003/0207696 A1 11/2003 Willenegger et al.

FOREIGN PATENT DOCUMENTS

WO WO 02/23791 A2 3/2002

OTHER PUBLICATIONS

3GPP Technical Report TR 25.992 V6.0.0 (Sep. 2003).
Document Tdoc G2-040286 (Mar. 2004).
Document Tdoc GP-040724 (Apr. 2004).
Document Tdoc GP-041006 (Apr. 2004).
Document Tdoc GP-040964 (Apr. 2004).
Document Tdoc GP-040877 (Apr. 2004).
3GPP Technical Specification No. TS 23.246 V6.1.0 (Dec. 2003).

* cited by examiner

Primary Examiner—Jean A Gelin
(74) Attorney, Agent, or Firm—Finnegan, Henderson, Farabow, Garrett & Dunner, L.L.P.

(57) ABSTRACT

An acknowledged MBMS service in which a procedure for providing retransmissions of incorrectly received data blocks is performed, together with an outer coding of the data blocks to be transmitted to the MBMS MSs. A sequence of data blocks carrying information related to the MBMS service is encoded at a BSS (Base Station Sub-system) of the mobile network by an outer coding unit. After the outer coding, the resulting data block sequence is sent to the MBMS MSs. If a data block of the outer coded sequence is badly received by a number of MBMS MSs, corresponding negative acknowledgements (nacks) are sent by such MSs to the BSS. The MSs also notify the BSS, with a positive acknowledgement, if they succeed in outer code decoding the sequence of the MBMS carrying information data blocks, in spite of possible badly received data blocks. The BSS manages retransmissions of the nacked data blocks taking into account the positive acknowledgements related to the outer code decoding by disabling retransmission of nacked data blocks of a positively acknowledged sequence.

27 Claims, 9 Drawing Sheets

METHOD AND SYSTEM FOR EFFICIENT DISTRIBUTION OF MULTICAST SERVICES IN A MOBILE NETWORK

CROSS REFERENCE TO RELATED APPLICATION

This application is a national phase application based on PCT/IT2004/000256, filed May 10, 2004, the content of which is incorporated herein by reference.

TECHNICAL FIELD OF THE INVENTION

The present invention generally relates to the field of telecommunications, and more particularly to wireless, mobile communications networks, such as mobile telephony networks. Specifically, the invention concerns the distribution of relevant amounts of data, such as multimedia information contents, to mobile user terminals (e.g., mobile phones) through a wireless, mobile communications network.

BACKGROUND OF THE INVENTION

Mobile telephony networks were initially conceived for enabling voice communications, similarly to the wired, Public Switched Telephone Networks (PSTNs), but between mobile users. Mobile telephony networks have experienced an enormous spread, especially after the introduction of second-generation mobile cellular networks, and particularly digital mobile cellular networks such as those complying with the Global System for Mobile communications (GSM) standard (and its United States and Japanese corresponding systems).

The services offered by these cellular networks in addition to plain voice communications have rapidly increased in number and quality; just to cite a few examples, Short Messaging System (SMS) and Multimedia Messaging System (MMS) services, and Internet connectivity services have been made available in the last few years.

Similarly to the PSTNs, second-generation cellular networks are switched-circuit networks; this greatly limits the bandwidth that can be allocated for a given user, especially in second-generation mobile networks. On the contrary, data communications networks such as computer networks and, among them, the Internet, adopt packet switching schemes, which allow much higher data transfer rates.

Some solutions have been proposed to overcome the limitations of conventional, switched-circuit cellular networks such as the GSM networks, so as to enable users of mobile terminals efficiently exploiting services offered through the Internet. One of the solutions that is acquiring a significant popularity is the General Packet Radio Service (shortly, GPRS). The GPRS is a digital mobile phone technology compatible with GSM networks (actually, built on the existing GSM network architecture) that enables data transfer at a speed higher than that allowed by pure GSM. Essentially, the GPRS can be viewed as a GSM add-up that supports and enables packet-based data communication. Although third-generation wireless communications systems such as those complying with the Universal Mobile Telecommunication System (UMTS) are more promising in terms of data transfer rates, the GPRS is a ready-at-hand solution for enhancing the data exchange capabilities of already existing GSM networks.

In GPRS communications networks the information content is usually transferred in a point-to-point (p-t-p) modality (or unicast modality), upon activation of a session between a GPRS mobile phone (or mobile station) and a service provider connected to a packet data network, e.g. a server connected to the Internet; the activation of such a session involves the setting up of logic connections between the server and the GPRS mobile phone. In such a p-t-p communication mode, the radio resources to be allocated for the exchange of data between the ground GPRS network and the GPRS mobile stations depend on the number of different mobile stations simultaneously exploiting the GPRS services, even if the same GPRS service is being exploited by two or more mobile station users at the same time. Clearly, this limits the possibility of simultaneously accessing available GPRS services by several users, unless the radio resources are oversized.

Thus, it is desirable to have the possibility of delivering information contents related to a same GPRS service exploitable by two or more users at a time through a point-to-multipoint (p-t-M) modality, so as to save the amount of allocated resources.

In this respect, the 3GPP ($3^{rd}$ Generation Partnership Project) is discussing the implementation, in the GERAN (GSM/EDGE Radio Access Network) framework, of a new kind of service, named MBMS (Multimedia Broadcast/Multicast Service).

Basically, MBMS targets simultaneous distribution of information content (e.g. multimedia content) to more than one user from a single serving base station over a common radio resource.

A general problem related to a service exploiting a p-t-M modality, such as MBMS, is to provide a satisfying and reliable service at least for most users.

In this respect, a first approach followed by 3GPP was not to guarantee reception of MBMS at RAN (Radio Access Network) level: see 3GPP Technical Report TR 25.992 V6.0.0 (2003-09). According to this Technical Report, MBMS should not support individual retransmissions at the radio link layer, nor should it support retransmissions based on feedback from individual subscribers at the radio level.

In more recent submissions made at GERAN Meetings #18 and #19, some proposals have been made in order to provide the network with suitable procedures adapted to lowering the loss rate of the p-t-M transmission, or at least to derive information on the quality of service perceived by the users.

Document Tdoc G2-040286 ("Common Feedback Channel for MBMS delivery"), submitted by Siemens at the GERAN WG2 #18 bis Meeting, held in Phoenix, Ariz., U.S.A. from Mar. 22 to Mar. 26, 2004, discloses definition of a Common Feedback CHannel (CFCH) intended to be used as a feedback channel, where negative acknowledgments (nack) are sent as access bursts at precise times. More specifically, according to the proponents, feedback messages are sent by all interested Mobile Stations (MSs) as access bursts on the CFCH at a precise time: if a MS does not decode the RLC (Radio Link Control) block transmitted at time t, it will send an access burst at time t+$\Delta$t; if a MS successfully decodes the RLC block transmitted at time t, nothing is transmitted on the feedback channel at time t+$\Delta$t. The consequence is that, if an access burst is detected at time t+$\Delta$t, the network realizes that the block transmitted at time t has not been received (at least) by one MS.

Document Tdoc GP-040724 ("Draft CR to TS 43.246: Outer Coding in the RLC for MBMS"), submitted by Siemens at the GERAN #19 Meeting, held in Cancun, Mexico, from Apr. 19 to Apr. 23, 2004, discloses the use of outer coding using Reed-Solomon codes at the RLC layer for MBMS. According to this document, in the BSS (Base Station Subsystem) an outer coding unit is located between the LLC frame segmentation and the RLC/MAC block buffer, and before block headers (including the BSN, Block Sequence Number) are added to each LLC segment. For a code (n,k), the outer coding unit generates (n−k) parity blocks from k systematic blocks. The headers are then added to each segment sequentially starting with BSN=0. In the MS (Mobile Station), the received RLC/MAC blocks are passed, sequentially, to the outer coding unit together with the BSN. After decoding, the parity blocks are discarded and only the systematic blocks reassembled into LLC frames, which are then passed to the LLC layer.

Document Tdoc GP-041006 ("Draft CR to TS 43.246: User feedback using the CFCH"), submitted by Siemens at the GERAN #19 Meeting, held in Cancun, Mexico, from Apr. 19 to Apr. 23, 2004, discloses an outer coding and a feedback channel used together. In particular, the disclosed feedback channel is the CFCH (see above). In the document, it is disclosed that if outer coding at the RLC layer is used, it is not necessary to send a negative acknowledgement for every RLC block in error. According to the proposal, when outer coding and a feedback channel are used together, systematic and parity blocks are prepared at transmitting side. Then only the systematic ones are initially sent, while the parity ones are used to provide additional redundancy only once a negative acknowledgement is received.

In particular, for a code (n,k) the outer coding unit
generates n−k parity blocks from k systematic blocks
assigns BSNs to the n RLC blocks, with the following rule:
systematic blocks will be assigned BSN=(M·n, . . . , M·n+k−1)
parity blocks will be assigned BSN=(M·n+k, . . . , M·n+n−1)

where M is the outer code block number starting from zero.

Then only (M·n, . . . , M·n+k−1) blocks are initially transmitted, while parity ones are sent only upon feedback reception. Every time a negative acknowledgement—referred to the reception of the systematic blocks—is received, p parity blocks (M·n+k, . . . , M·n+k+p−1) are transmitted (where p is a divisor of n−k). If a further nack is received—referred to the first p parity blocks—other p parity blocks (M·n+k+p, . . . , M·n+k+2·p−1) are sent and so on, until no nack is received or all the n−k parity blocks have been sent.

At the receiving side, every MS will send a negative acknowledgement in the following cases:
1. every time the detection of the header of an RLC/MAC block (with its BSN) fails.
2. when, after detecting (from the BSN) the outer code block number M and outer code segment i (i=1, . . . , n), the MS computes the number of still expected blocks ($Last_M - i$) and realizes that the following condition is true (number of already received RLC blocks)$_M$ + ($Last_M - i$) < k where $Last_M$ is the last expected outer code segment for outer code block number M, and is equal to k during the transmission of the k systematic blocks, to k+p during the transmission of the initial p parity blocks, to k+2·p . . . .

Once a nack for block M is sent, a flag is internally set, and no other nack for the same outer code block can be sent during the transmission of the current set of blocks (k systematic, first p parity, second p parity ones, etc.).

Document Tdoc GP-040964 ("MBMS p-t-m channel with feedback"), submitted by Ericsson at the GERAN #19 Meeting, held in Cancun, Mexico, from Apr. 19 to Apr. 23, 2004, discloses a proposal for p-t-M with feedback. In such proposal, the MBMS service still uses unacknowledged transmission in the delivery of the MBMS data, but the network can poll for Packet Downlink Ack/Nack reports similar to the RLC acknowledged mode. In particular, the MSs are allocated a number of DL (Downlink) timeslots, e.g. 4. All MSs are allocated the same DL timeslots. The MSs are also allocated an UL (Uplink) timeslot. One of the DL timeslots is the "main" timeslot on which polling requests are sent. MSs are polled for Ack/Nack reports with their unique MS ID. The MS should receive blocks that have a valid MS ID in the TFI (Temporary Flow Identifier) field (a subset of the TFI: e.g. those match 0xxxx). The MBMS MS will first look at the first bit of the TFI. If that is set to 1, the MBMS MS will ignore the block. If it is set to 0, it will receive the block. The MS will also look at the four last bits of the TFI to see if it matches the MS's MS ID. If so, it will send an ACK/NACK report in the UL block indicated by the RRBP.

Document Tdoc GP-040877 ("Proposal for MS counting, addressing and RLC/MAC Ack/Nack management in MBMS"), submitted by Telecom Italia at the GERAN #19 Meeting, held in Cancun, Mexico, from Apr. 19 to Apr. 23, 2004, discloses methods for counting, addressing the MSs and managing the RLC/MAC Ack/Nack in MBMS. According to the proposal, in order to guarantee an adequate perception of the service from the users' point of view, the RLC/MAC mode of operation has to be an acknowledged one. Since all the MSs involved in the specified MBMS are multiplexed on the same timeslots on the DL and addressed via the same TFI, a further identifier for addressing a specific MS is needed, named MFI (Mobile Flow Identity), a new field to be included, when needed, in the extended RLC header of an RLC/MAC block. The global (TFI+MFI) identifier allows the BSS to address a specific MS among those involved in the specified MBMS session. A MS addressed via (TFI+MFI) sends a Packet Downlink Ack/Nack, including its MFI, in order to let the BSS detect the correct identity of the responding MS. The BSS processes all the Packet Downlink Ack/Nack messages received within a request period from all the MSs, in order to manage retransmissions of data blocks. The retransmissions on the BSS side may be performed according to an exhaustive algorithm, in which all the radio blocks referred to as Nacked in any received Packet Downlink Ack/Nack are retransmitted, or to a selective algorithm, based on the overall number of Nacked radio blocks, on a threshold relevant to the percentage of MSs requesting the retransmission of a specific radio block and on the MFI of the MSs requesting the retransmissions.

SUMMARY OF THE INVENTION

According to the Applicant, in order to solve the above stated general problem of providing a satisfying and reliable MBMS service, the sole use of outer coding procedures may cause either excessive complexity, i.e. processing requirements (in particular at the mobile station), in case of use of a high number of parity blocks, or poor recovering of information content, in case of use of a low number of parity blocks. A high number of parity blocks also causes strong bandwidth reduction, which may be unacceptable for network operators.

Furthermore, according to the Applicant, while an acknowledged mode of operation may be a better solution to the above stated general problem of providing a reliable and satisfying MBMS service, an excessive number of retransmissions of badly received data blocks may cause remarkable delays in the radio transmission to the mobile stations.

The Applicant has tackled the problem of providing an acknowledged MBMS service in which transmission delays could be reduced, even in presence of a high number of needed retransmissions.

The Applicant has found that this problem can be solved by providing, in addition to a procedure for providing retransmissions of incorrectly received data blocks, an outer coding of the data blocks to be transmitted to the MBMS MSs. A sequence of data blocks carrying information related to the MBMS service are encoded at a BSS (Base Station Subsystem) by an outer coding unit. After the outer coding, the resulting data block sequence is sent to the MBMS MSs. If a data block of the outer coded sequence is badly received by a number of MBMS MSs, corresponding negative acknowledgements (nacks) are sent by such MSs to the BSS. The MSs also notify the BSS, with a positive acknowledgement, if they succeed in outer code decoding the sequence of the MBMS carrying information data blocks, in spite of possible badly received data blocks. The BSS manages retransmissions of the negatively acknowledged ("nacked") data blocks taking into account of the positive acknowledgements related to the outer code decoding, by disabling retransmission of nacked data blocks of a positively acknowledged sequence.

The applicant has found that this problem may be solved in accordance with a first aspect of the present invention, by a method for distributing identical information to a plurality of mobile stations located in a geographical area of a mobile network, comprising:

generating a first sequence of data blocks carrying said information content;

performing an outer code encoding of said first sequence of data blocks, so as to obtain a second sequence of data blocks;

transmitting the second sequence of data blocks to said mobile stations;

receiving, from said mobile stations, negative acknowledgements related to at least one incorrectly received data block of said second sequence; and conditionally re-transmitting said at least one incorrectly received data block of said second sequence based on a number of said negative acknowledgements, wherein said conditionally re-transmitting comprises:

receiving, from said mobile stations, a number of positive acknowledgements related to a correct outer code decoding of said second sequence of data blocks; and disabling re-transmission of said at least one incorrectly received data block of said second sequence upon reception of said number of positive acknowledgements.

In a second aspect, the invention relates to a base station sub-system for a mobile network adapted for distributing identical information content to a plurality of mobile stations located in a geographical area of a mobile network, said base station sub-system being adapted for:

generating a first sequence of data blocks carrying said information content;

performing an outer code encoding of said first sequence of data blocks, so as to obtain a second sequence of data blocks;

transmitting the second sequence of data blocks to said mobile stations;

receiving, from said mobile stations, negative acknowledgements related to at least one incorrectly received data block of said second sequence; and conditionally re-transmitting said at least one incorrectly received data block of said second sequence based on a number of said negative acknowledgements, wherein said conditionally re-transmitting comprises:

receiving, from said mobile stations, a number of positive acknowledgements related to a correct outer code decoding of said second sequence of data blocks; and disabling re-transmission of said at least one incorrectly received data block of said second sequence upon reception of said number of positive acknowledgements.

The invention also contemplates a mobile network comprising at least one base station sub-system as described above.

For the purposes of the present invention, by the expression "a number", related to either positive and/or negative acknowledgements, it is to be intended at least one positive and/or negative acknowledgement.

The features and advantages of the present invention will be made apparent by the following detailed description of preferred embodiments thereof, provided merely by way of non-limitative example, description that will be conducted making reference to the attached drawings.

DETAILED DESCRIPTION OF PREFERRED EMBODIMENTS OF THE INVENTION

Figure 1:
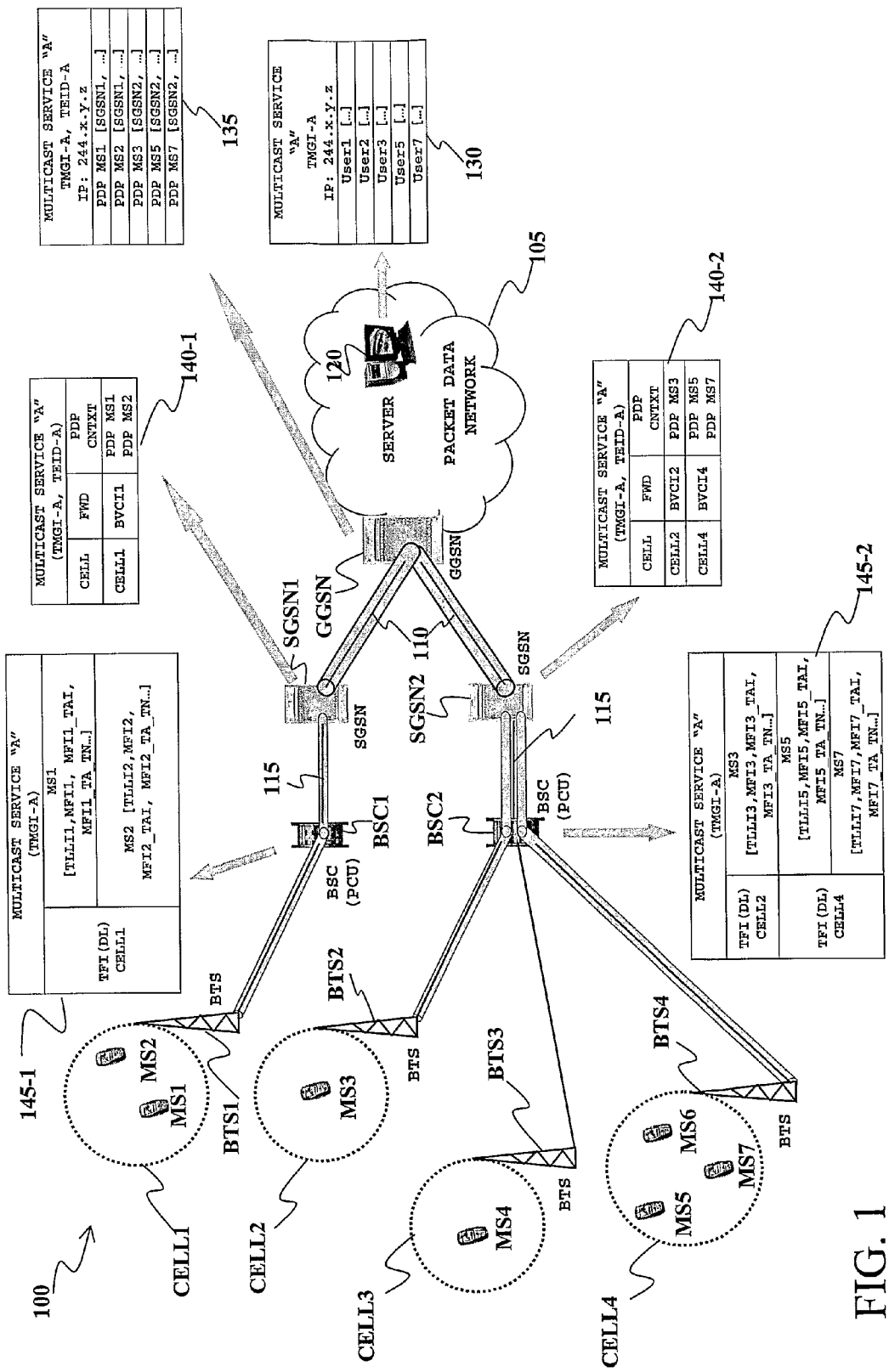
FIG. 1 is a schematic view of a GPRS network supporting multicast services, adapted to implement a method according to an embodiment of the present invention.

With reference to the drawings and, particularly, to FIG. 1, a cellular mobile communications network 100, particularly a GSM network, is schematically shown. The mobile communications network 100 comprises a plurality of Base Station Subsystems (BSSs), each one providing coverage for cellular communications in a respective geographic region.

The generic BSS comprises a plurality of Base Transceiver Stations (BTSs), each one covering a respective geographic area within the region covered by the BSS; the number of BTSs in a BSS may be in the practice rather high but, for simplicity of the drawing, only four BTSs BTS1, BTS2, BTS3 and BTS4 (pictorially represented by an antenna) with an associated cell CELL1, CELL2, CELL3 and CELL4 (schematically depicted as an area surrounded by a dashed circle) are shown in FIG. 1. The generic BTS communicates with users' Mobile Stations (MS), typically cellular phones, which are located in the BTS's cell, such as the MSs MS1 and MS2 within the cell CELL1, the MS MS3 within the cell CELL2, the MS MS4 within the cell CELL3 and the MSs MS5, MS6 and MS7 within the cell CELL4.

Typically, a plurality of BTSs are connected to a same Base Station Controller (BSC), a network unit that controls the BTSs; for example, all the BTSs of a same BSS are connected to a same BSC, such as, making reference to FIG. 1, the BSC BSC1 to which the BTS BTS1 is connected, and the BSC BSC2 to which the other three BTS BTS2, BTS3 and BTS4 are connected. Roughly speaking, the BTSs handle the actual transmission/reception of signals to/from the MSs, whereas the BSCs instruct the different BTSs about which data have to be transmitted on specified physical, radio communication channels.

FIG. 1 schematically depicts network elements that, according to the GPRS standard, enable the MSs, connected to the cellular mobile communications network 100, to access an external packet-based data communications network (shortly, a packet data network) such as, for example, the Internet and/or an Intranet, more generally any data communications network in which data are exchanged in packets, i.e. according to a packet-switched scheme instead of a switched-circuit one, particularly but not limitedly any network adopting the Internet Protocol (IP). In the drawing, the external packet data network is shown only schematically, and it is identified globally by 105; hereinafter, it will be assumed that the external packet data network 105 is the Internet, but this is not to be intended as a limitation, being merely an example.

Without entering into excessive details, known per-se in the art and not relevant to the understanding of the invention embodiment herein described, at least one Gateway GPRS Support Node (GGSN) GGSN is provided to act as an interface between the cellular network 100 and one or more external packet data network, such as the Internet 105. The GGSN GGSN exchanges data packets, through a GPRS backbone network 110, with one or more Serving GPRS Support Nodes (SGSN), such as the two SGSNs SGSN1 and SGSN2 shown in the drawing. The generic SGSN is associated with one or more respective BSSs, and routes the data packets received, through the GGSN (or one of the GGSNs, if more than one GGSN exist) and the GPRS backbone network, from the external packet-based communications network (or one of the external packet-based communications networks), to the proper destination MS, located in the geographic area covered by the respective BSS (or by one of the respective BSSs); for example, the SGSN SGSN1 routes the data packets received, through the GGSN GGSN and the GPRS backbone network 110, from the external packet-based communications network 105 to the MS MS1 and/or the MS MS2. It is observed that a single SGSN may communicate with a plurality of GGSN, for receiving data packets from different external packet data networks.

In order to provide data packet-based communications services, each BSC is associated with a respective Packet Control Unit (PCU), not explicitly shown in the drawing because intended as part of the BSCs. The PCU behaves as an interface of the BSC to a packet-based data communications network 115 internal to the cellular network 100 and connecting the BSC to a respective SGSN, such as the SGSN SGSN1 for the BSC BSC1 and the SGSN SGSN2 for the BSC BSC2. The PCU converts the data packets, received from the respective SGSN through the internal packet-based data communications network 115 and directed to the destination MS, into data streams adapted to being transmitted "over the air", by one of the BTSs, exploiting the radio resources of the network. Furthermore, data streams transmitted by the MS "over the air" and received by the BTS are converted into data packets formatted according to the protocol supported by the internal packet-based data communications network 115, for transmission to the respective SGSN, in the drawing the SGSN SGSN1 or SGSN2, and to the GGSN GGSN.

Conventionally, the procedure for enabling the user of a generic MS supporting GPRS communications (a GPRS MS), for example the MS MS1 in the cell CELL1, to exploit services provided by a service provider or content provider 120 (the server) accessible through the Internet 105 or, shortly stated, the fruition by a GPRS MS of a GPRS service, essentially involves two steps: a first step (called Packet Data Protocol—PDP—context activation) in which a logic connection (the PDP context) is created between the GPRS MS MS1 and the server 120 providing the service contents; and a second step (called Temporary Block Flow—TBF—activation/release) in which the cellular network 100 assigns to the GPRS MS MS1 prescribed physical communication resources, namely radio resources for transmission on the "over the air" radio link portion of the cellular network 100.

In particular, without entering into excessive details well known to those skilled in the art, the GPRS MS MS1 (after having registered at the SGSN serving the cell CELL1 in which the GPRS MS MS1 is located at that moment, in the example the SGSN SGSN1) sends to the SGSN SGSN1 a request for activation of a PDP context; the PDP context defines the packet data network to be used (in the example, the Internet 105), the GGSN to be used for accessing the Internet 105 (the GGSN GGSN in the present example), and other parameters. The PDP context request triggers a PDP context activation procedure in which the MS MS1, the SGSN SGSN1 and the GGSN GGSN exchange information useful to negotiate PDP context parameters. The PDP context activation procedure results in the definition of a data packets transfer path between the GGSN GGSN and the PCU servicing the BTS BTS1 that covers the cell CELL1 in which the MS MS1 is located. A PDP context, i.e. a logic connection between the GPRS MS MS1 and the server 120 is thus created.

The activation of the PDP context does not involve per-se the allocation of physical communication resources of the cellular network 100, but merely establishes a logic connection between the GPRS MS and the server; thus, the PDP context, once activated, may be kept active for hours, in principle forever, even when there are no data to be exchanged between the server 120 and the GPRS MS MS1, until the GPRS MS MS1 (or, possibly, the server 120) deactivates it.

After the PDP context has been activated, the BSC BSC1 checks whether there are data received from the server 120 through the respective PCU to be transmitted to the GPRS MS MS1; in the affirmative case, i.e. when there are data to be exchanged between the server 120 and the GPRS MS MS1, a TBF is activated by the BSC BSC1.

The activation of the TBF determines the allocation of physical radio communications resources of the cellular network 100, i.e. of a radio channel (an airlink channel), to the MS MS1 for enabling the exchange of the data packets from the data transfer path (converted in a suitable data stream by the PCU) through the proper BSC and BTS BSC1 and BTS1 over the air to the MS MS1. When the data have been exchanged, the TBF is deactivated and the radio resources are released; provided the PDP context is not closed, the BSC BSC1 waits for new data to be exchanged. Thus, differently from the PDP context, the TBF, i.e. the physical, radio communications resources of the GSM network 100 are kept allocated for the MS MS1 only as long as there are data to be transmitted/received to/from it, and are released as soon as the data have been exchanged, keeping the radio resources free for other uses/users. In other words, a TBF is temporary and is maintained only for the duration of the data transfer.

According to the GPRS standard, to each TBF an indicator is univocally assigned, called Temporary Flow Identity (TFI). Roughly speaking, the TFI is exploited for managing the scheduling of the data to be transmitted in downlink (i.e., from the BSC and BTS BSC1 and BTS1 to the destination MS MS1); different GPRS service users within a same cell are assigned different TFIs. The TFI allows discriminating between different entities at the Radio Link Control (RLC) layer, that is, a given TFI univocally addresses a respective RLC entity and is inserted in a header portion of all the RLC data blocks transmitted. Typically, the TFI is a five-bit binary number. When the TBF is activated, a TFI is assigned thereto and such a TFI is communicated to the destination MS MS1 by means of the messages exchanged during the access procedure (e.g. through a PACKET DOWNLINK ASSIGNMENT message). The TFI is thus an identifier of the logic connection between the BSC and the MS.

At the physical level, the GPRS is based on the physical layer of the GSM standard.

As known in the art, the GSM standard provides, for the communications between the BTSs and the MSs, a plurality of radio channels having a bandwidth of 200 KHz, associated with a plurality of radio carriers; particularly, 124 radio carriers are provided, and a hybrid Frequency Division Multiple Access (FDMA)/Time Division Multiple Access (TDMA) access scheme associates a number, e.g. eight, of timeslots (physical channels) with each carrier. The transmission to/from a given MS takes place discontinuously, only within the timeslot cyclically assigned to that MS; a cycle is the succession in time of all the eight timeslots, and is referred to as a radio frame. Once the MS has been granted access to a given carrier the transmission and reception are accomplished in distinct time slots.

The physical level used by the GPRS system is based on the GSM one, superimposing thereto a different logic structure. Control and data traffic "logical" channels are multiplexed in time and frequency division on a single GPRS physical channel, called Packet Data CHannel (PDCH).

A PDCH corresponds to a physical GSM channel, and is defined, in the frequency domain, by a radio carrier number (one of the 124 carriers), and, in the time domain, by a timeslot number (one of the eight timeslots within that carrier). The timing and duration of the timeslots are identical to those defined for the GSM system. The control and data traffic GPRS logical channels are multiplexed in time so as to share the same PDCH at physical level.

Figure 2:
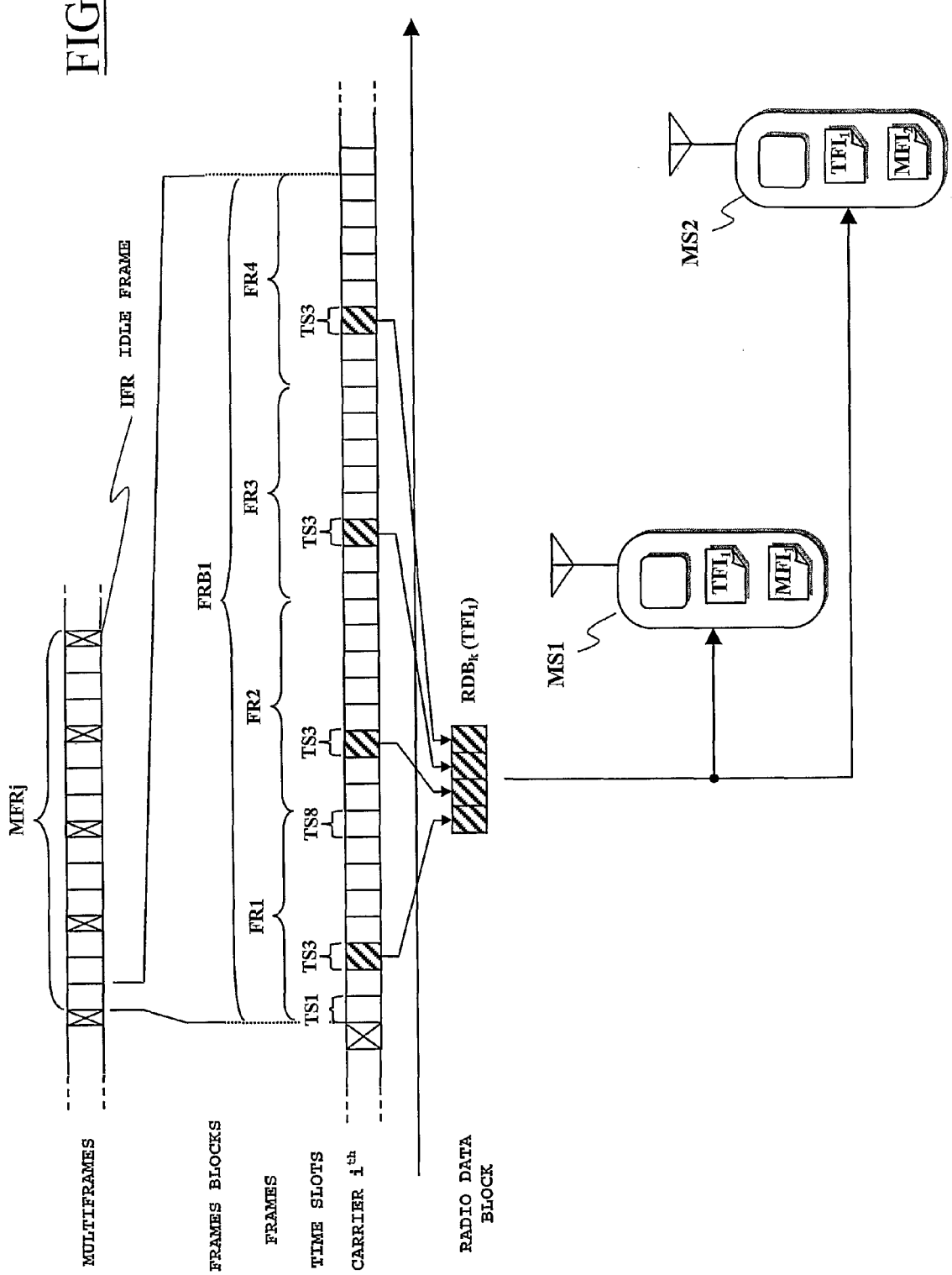
FIG. 2 schematically shows how data relating to a same GPRS service are distributed in multicast to several mobile stations in a cell at a time, without a waste of radio resources, in one embodiment of the present invention.

As pictorially shown in FIG. 2, given a prescribed radio carrier ("CARRIER $i^{th}$" in the drawing), which is one of 124 radio carriers of the GSM standard, the radio frames (each one including eight time slots TS1 to TS8) are grouped in groups of fifty-two radio frames, so as to form a so-called multiframe, such as the multiframe MFR] depicted in the drawing. Each multiframe is subdivided into twelve frame blocks, such as the frame block FRB1 shown in the drawing, including each one four radio frames. Between adjacent triplets of frame blocks, an idle frame IFR is interposed, left deliberately free of data.

The multiframe periodically repeats every fifty-two radio frames. The different GPRS control and data traffic logic channels are multiplexed together based on a subdivision into blocks (Radio Data Blocks or RDBs) of the data to be transmitted. The radio data blocks are the basic transport structure of a GPRS logic channel: a given radio data block is thus univocally dedicated to a respective GPRS logic channel, being a data traffic channel or a control channel. The assignment scheme of the radio data blocks to the different logic channels is transmitted, together with other control information, over a GPRS control logic channel PBCCH (Packet Broadcast Control CHannel), having a fixed position within the multiframe.

As for voice communications, radio transmission takes place as a sequence of four "normal bursts", according to the GSM standard specification. Every radio data block, such as the radio data block $RDB_k$ shown in the drawing, is transmitted during four consecutive radio frames of the same PDCH, such as the frames FR1 to FR4 in the drawing, exploiting one (possibly more, depending on the radio resources allocated to that logic channel, and on the fact that the MS supports multislot communications, a feature referred to as the multislot class of the MS) timeslot in each frame, such as the timeslot TS3 in the drawing.

Still according to the GPRS standard, every radio data block includes a header portion containing the TFI that univocally identifies the TBF, in addition to other parameters. In this way, two or more traffic flows belonging to different users can be multiplexed on a same timeslot, or group of timeslots, in downlink or in uplink to or from the MSs.

Each MS in a cell listens to every radio data block transmitted by the BTS on the group of timeslots assigned to the MS; however, a MS being destination of GPRS data, that is a MS such as the MS MS1 having activated a PDP context, having been assigned a TBF, e.g. $TBF_1$, and having been assigned and communicated a respective TFI, e.g. $TFI_1$, only captures those radio data blocks that, similarly to the radio data block $RDB_k$ in the drawing, are labeled by that TFI $TFI_1$, i.e. by the TFI that has previously been communicated thereto, when the TBF was activated; all the other radio data blocks, not labeled by the correct TFI $TFI_1$, are discarded by the MS MS1. The TFI is thus used by the MS substantially as a tuning information, which the MS uses for tuning onto the physical communication channel on which the GPRS data directed to the MS are transmitted.

In a GPRS network not supporting multicast services, if a different MS in the same cell as the MS MS1, for example the MS MS2 shown in FIG. 1, wishes to exploit, through the GPRS network, the same services made available by the server 120 as those being already exploited by the MS MS1, a procedure identical to that described in the foregoing has to be performed, leading to the activation of another PDP context and, even worse, to the activation of different TBFs when data have to be exchanged with the MS MS1, i.e. to the allocation of additional radio resources different from those already allocated by the GSM network 100 for the MS MS1. This is clearly a waste of resources, especially when the services exploited are relatively heavy in terms of data to be downloaded to the MSs, such as in the case of delivery of multimedia contents, audio or video (e.g. real-time contents such as for example television programs) streaming, and the availability of GPRS services offered to the users may be severely limited, unless the GSM network infrastructure is greatly oversized.

Figure 3:
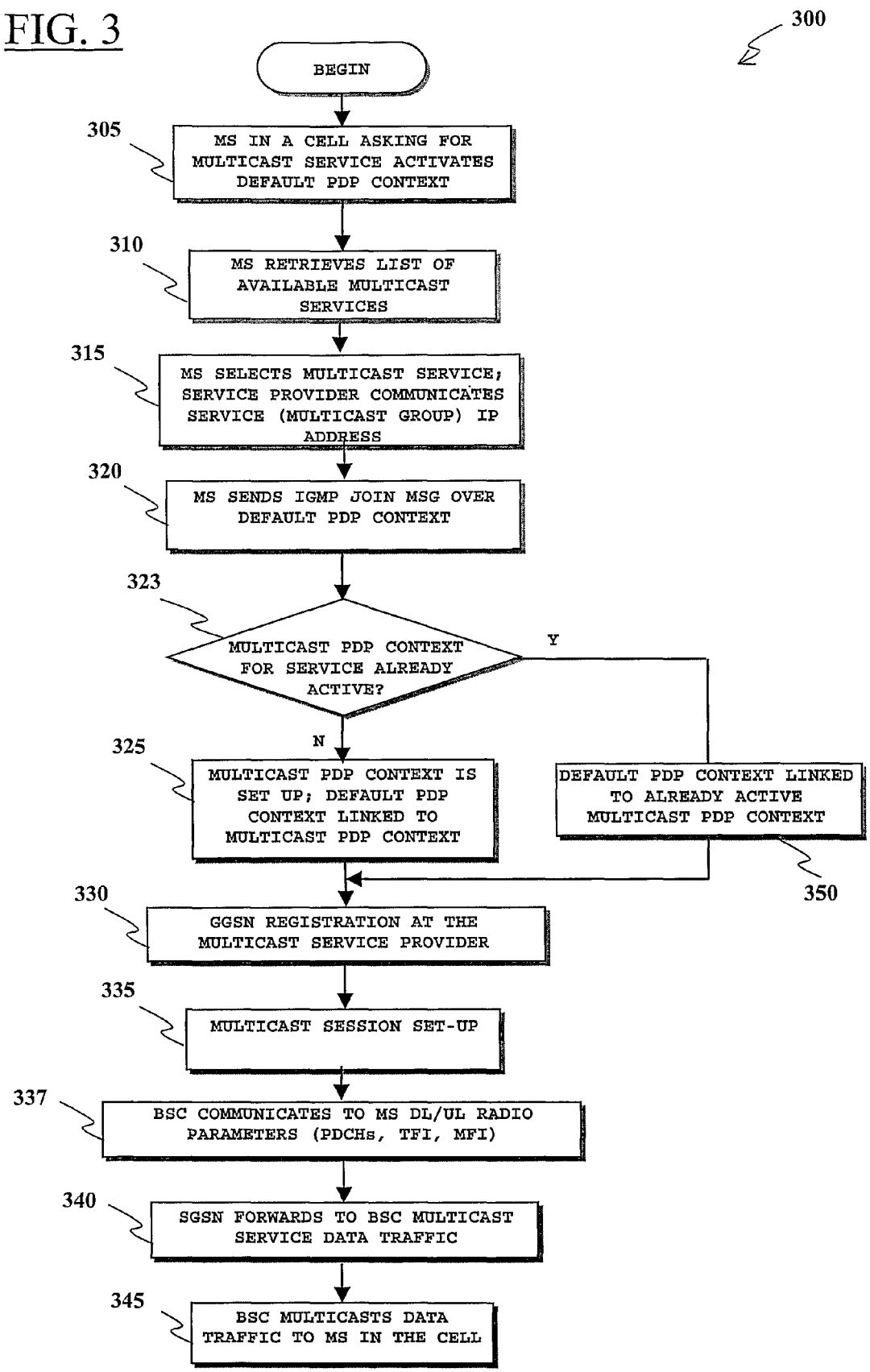
FIG. 3 is a schematic flowchart illustrating the operation of the GPRS network of FIG. 1, in respect of a generic multicast service.

In order to avoid such a waste of resources, the GPRS network is rendered capable of supporting multicast service data distribution, in the preferred way described hereinbelow with the aid of the simplified flowchart 300 of FIG. 3.

In a way totally similar to the conventional procedure described above in respect of a generic GPRS service, when the user of a generic MS, e.g. the MS MS1, requires a certain GPRS service which is offered in multicast (in the following simply referred to as a multicast service), the MS MS1 activates a standard, unicast PDP context (henceforth referred to as the default PDP context) (block 305). The GSM/GPRS network component BSC1 assigns to the MS MS1 the downlink (i.e., from the BCS/BTS to the MS) and uplink (i.e., from the MS to the BTS/BSC) data traffic radio channels, according to standard procedures carried out at the RLC/MAC levels.

The MS MS1 then retrieves the list of available multicast services from a dedicated server within the packet data network 105, for example (but not necessarily) the same server 120 offering the multicast services (block 310). Upon selection by the MS MS1 of one of the available multicast services in the list of available services, for example the multicast service "A", for example a television (TV) service, the server 120 communicates to the MS MS1 an identifier, which can be for example an Internet Protocol (IP) address, e.g. 244.x.y.z, assigned by the server 120 to the MS MS1 (block 315); this same IP address may be used by the server 120 to identify a multicast group associated with the GPRS service "A", i.e. a group of MSs which have requested to exploit/are exploiting the multicast service "A"; such a group is schematically depicted in FIG. 1 as a table 130, related to the multicast service "A" and intended to include information relating to the users User1, . . . , User7 that have requested to exploit/are exploiting the multicast service "A". The server 120 may assign to the multicast group 130 a Temporary Multicast Group Identity (TMGI), which is assigned to the multicast group temporarily as long as there is at least one MS in the multicast group.

The MS MS1 then sends an IGMP JOIN message (IGMP: Internet Group Management Protocol) over the default PDP context, to signal its interest in joining the multicast group related to the selected multicast service "A" (block 320). The Internet Group Management Protocol is a standard for IP multicasting in the Internet, used to establish host memberships in particular multicast groups on a single network. As a result, a multicast PDP context is set up by the competent GGSN GGSN (block 325), after having checked that one such multicast PDP context is not already active (decision block 323, exit branch N). In particular, the multicast PDP context may be set up following the guidelines for service activation defined in the 3GPP Technical Specification No. TS 23.246, v6.1.0.

During multicast PDP context set up the GGSN GGSN performs a registration procedure to the server 120 (block 330). The server 120 gets information about the MS MS1 and stores such information in the table 130 corresponding to the group for multicast service "A". The GGSN GGSN stores user information in a table (shown schematically in FIG. 1 and identified therein as 135) related to the multicast service "A" (several of such tables may exist at the GGSN, one for each multicast service for which a multicast PDP context has been set up). Similarly, the competent SGSN SGSN1, responsible of the MS MS1, stores user information in a cell-related table (shown schematically in FIG. 1 and identified therein by 140-1 (140-2 identifies an equivalent cell-related table at the SGSN SGSN2) related to the multicast service "A" (again, several of such tables may exist at the SGSN, one for each multicast service for which a multicast PDP context has been set up).

The operations that allow the MS MS1 joining the multicast group 130 are completed, and the default PDP context that was activated by the MS MS1 is linked to the multicast PDP context.

Let it now be supposed that another MS, for simplicity of description an MS located in the same cell as the MS MS1, for example the MS MS2, requires a GPRS multicast service.

Similarly to MS MS1, the MS MS2 activates a respective standard unicast PDP context (default PDP Context). The GSM/GPRS network component BSC1 assigns to the MS MS2 the downlink and uplink traffic radio channels, according to standard procedures at the RLC/MAC levels (block 305). As in the previous case, the MS MS2 retrieves from the server 120 the list of available GPRS multicast services, among which there is the multicast service "A", for which a multicast PDP context has already been set up (block 310). If the MS MS2 selects the multicast service "A", the server 120 communicates to the MS MS2 the IP address 244.x.y.z of the corresponding multicast group (block 315). The MS MS2 then sends an IGMP JOIN message over its default PDP context, to signal the interest of the MS MS2 in the GPRS multicast service "A" (block 320).

The GGSN GGSN recognizes that a multicast PDP context for the multicast service "A" is already active (decision block 323, exit branch Y); thus, the GGSN GGSN does not activate another multicast PDP context, but instead links the new MS MS2 to the multicast PDP context already existing for the service "A" (block 350). Exception made for the fact that another multicast PDP context is not activated in the GGSN GGSN, signaling towards the MS MS2 may occur substantially in the same way as described before, following the guidelines for service activation defined in 3GPP Technical Specification No. TS 23.246 v6.1.0.

The GGSN GGSN stores information related to the new user in the table 135 related to the multicast service "A". Similarly, the competent SGSN SGSN1, responsible of the MS MS1, stores user information in the cell-related table 140-1 related to the multicast service "A".

The same procedure may be activated in case other MSs requires to exploit the multicast service "A".

The server 120 initiates the multicast session related to service "A" when it is ready to send data to the subscribers. A multicast session may be set up following the guidelines for session activation defined in the above-mentioned 3GPP Technical Specification No. TS 23.246 v6.1.0 (block 335).

Once the multicast session has been set up, and the server 120 is ready to deliver the multicast service "A", after a preliminary procedure by which the users (e.g., the MSs MS1 and MS2) that have registered for receiving the multicast service "A" are signaled about the imminent start, and the necessary radio resources are assigned thereto (block 337), the SGSN (e.g., SGSN1) starts forwarding to the BSC (in the example, the BSC BSC1) data traffic related to multicast service "A", on the basis of the information found in the respective cell-based table 140-1 (block 340). In particular, the SGSN SGSN1 receives data traffic from the GGSN GGSN through a GPRS Tunnel Protocol (GTP) tunnel whose Tunnel Endpoint IDentifier (TEID) corresponds to the multicast PDP context "A" (only one GTP tunnel, identified by a unique TEID, is created in respect of a given multicast service). The SGSN routes the traffic towards the proper (PCU of the) BSC based on a BSSGP Virtual Connection Identifier (BVCI). In FIG. 1, a BVCI BVCI1 identifies the cell CELL1 under BSC BSC1, a BVCI BVCI2 identifies the cell CELL2 under BSC2, and BVCI BVCI4 identifies the cell CELL4 under BSC2. The TMGI may be used for univocally identifying the traffic related to the multicast service throughout the network, including the BSCs and the MSs.

For each network cell, common radio resources are exploited for delivering data traffic related to the multicast service "A" to all the various MSs of the group for the multicast service "A" that are located in that cell, and the respective radio parameters are communicated to the MSs. In particular, a common TFI is assigned by the network and communicated to the MSs, such as the TFI $TFI_1$ that is communicated to the MSs MS1 and MS2 in cell CELL1. Furthermore, at least one common PDCH (preferably, a plurality of common PDCHs) is assigned by the network and communicated to the MSs. The data traffic received at the BSC BSC1 in respect of the multicast service "A" is thus delivered to the MSs MS1 and MS2 (block 345).

As mentioned before, the SGSN SGSN1 forwards the data traffic related to multicast service "A" on the basis of the information contained in the corresponding cell-based table 140-1, particularly the BVCI. The generic SGSN scans the respective cell-related table corresponding to the multicast service "A", and forwards one traffic flow per each cell identified by the TMGI related to service "A"; for example, assuming that the MS MS3 in cell CELL2, and the user MS5 in the cell CELL4, activated respective multicast PDP contexts for receiving the multicast service "A", the SGSN SGSN2 forwards the traffic relating to such a service to these users on the shared connection; if other users in the respective cells, for example the user MS7 in the cell CELL4, require to exploit the service "A", the respective SGSN, e.g. the SGSN SGSN2, does not forward additional traffic, and these other users, e.g. MS7, registered in the SGSN table under the same BVCI, receive the intended data traffic because they share the same TMGI and, in the respective cell (CELL4), the same downlink radio parameters PDCH(s) and TFI assigned for service "A".

According to the Applicant, it is important to guarantee an adequate perception of the multicast service from the users' point of view. For this purpose, according to the Applicant it is important to operate the network, at the RLC/MAC level, in an acknowledged mode. This means that it is important for the network apparatuses to be able to establish if and to what extent the traffic related to the GPRS multicast services is properly received by the MSs of the users.

The above-described method of implementing multicasting in the GPRS/GSM network is particularly effective, and avoids unnecessary duplication, i.e. waste, of network resources, both at the core GPRS network level (no proliferation of data traffic directed to users in a same cell) and at the physical, radio communication level (a same number of radio channels are occupied, irrespective of the number of users receiving a given service).

However, a problem related to the above described implementation of multicasting in a GPRS network is that, being all the MSs in a given cell registered to a same multicast service multiplexed on the same PDCH(s) on the downlink and addressed via a same TFI, it is not possible for the network apparatuses to address information, on the downlink, towards a specific MS of the multicast service group using the TFI (as usual in unicast services). This impossibility of individually addressing the MSs represents a severe limitation, particularly in respect of the desire of implementing effective retransmission policies based on the ack/nack of the data received by the users.

According to a preferred embodiment of the present invention, in order to overcome this limitation, a further parameter identifying the logic connection between the BSC and the MS (other than the TFI, which is common for all the MSs involved in multicast service) is defined and assigned, preferably by the network, to the MSs of a multicast service group, for specifying and, for example, addressing information to a specific MS among those which, being located in a same cell, receive in multicast a same GPRS service. In particular, in order to communicate the further parameter to the MSs, the BSC may compile a cell-based table of the MSs that have requested a generic multicast service, e.g. the service "A" herein considered by way of example. Two exemplary tables are schematically shown in FIG. 1, one for each BSC BSC1 and BSC2, and identified therein by 145-1 or 145-2. Hereinafter, the further parameter will be referred to as a Mobile Flow Identity (MFI).

According to an exemplary and not limitative embodiment of the present invention, a given MS in a cell that belongs to a multicast service group is addressed by the network apparatuses by including the respective MFI in downlink messages, for example within a message carrying the multicast service data. In particular, a dedicated field may be exploited, which is included, when needed by the network apparatuses, in a properly extended RLC header of a generic one of the RLC/MAC data blocks.

Figure 4A:
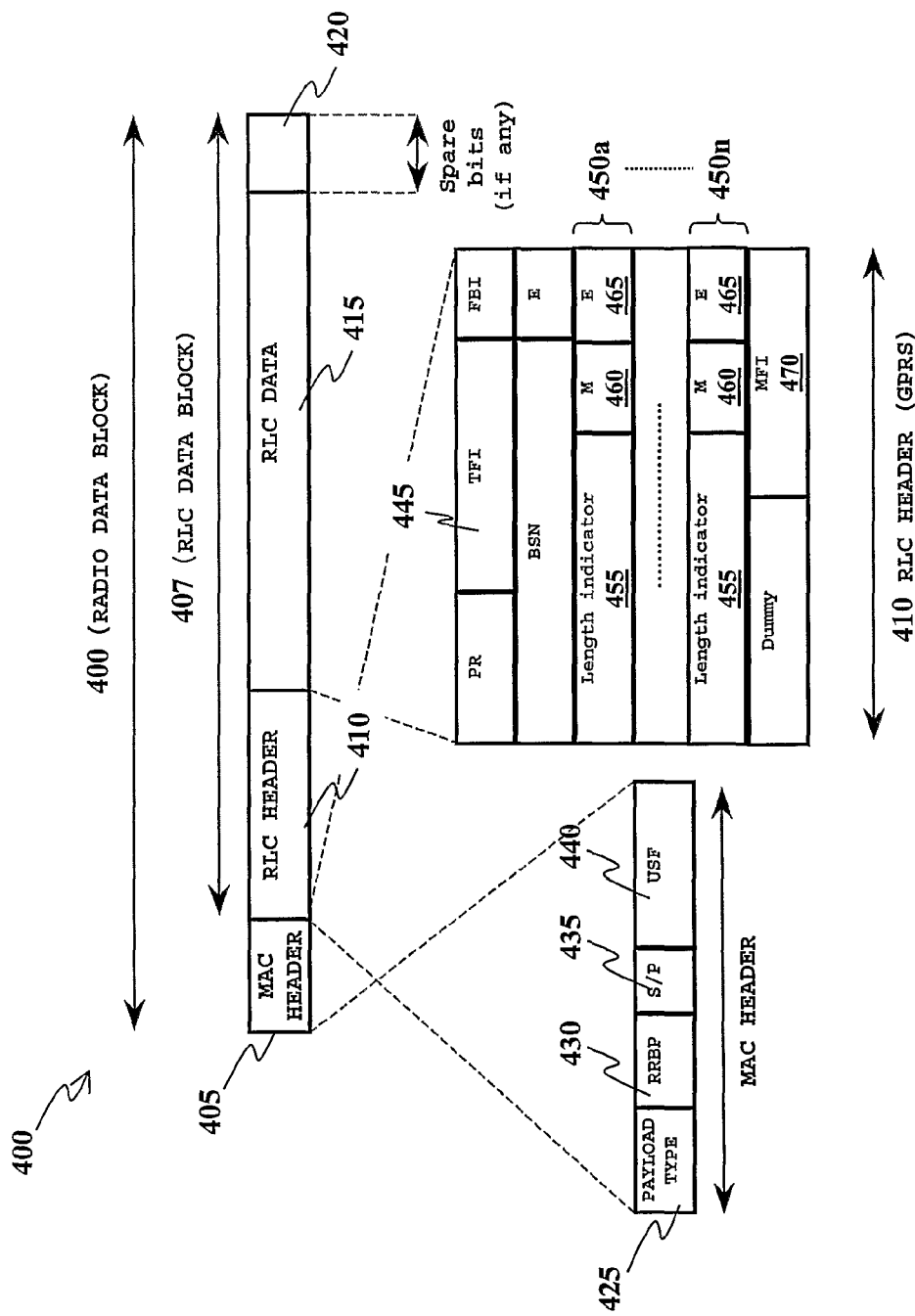
FIG. 4A is an exploded, more detailed pictorial representation of the structure of a GPRS radio data block, evidencing how users of a same multicast service are rendered distinguishable and individually addressable by the network apparatuses, in an embodiment of the present invention.

In greater detail, reference is made to FIG. 4A, wherein a more detailed pictorial representation of the structure of a generic GPRS radio data block is provided, in an exploded view.

The radio data block, globally identified by 400, includes a MAC header 405 and an RLC data block 407, comprised of an RLC header 410 and an RLC data portion 415, possibly terminating with one or more spare bits 420 (used, if necessary, as mere fillers for achieving the prescribed number of bits in the RLC data portion 415).

The MAC header 405 typically includes a first field 425, a second field 430 (Relative Reserved Block Period—RRBP), a third field 435 (Supplementary/Polling—S/P), and a fourth field 440 (Uplink State Flag—USF). The first field 425 contains information specifying the payload type, and allows identifying if the block is a data block (i.e., a block carrying data) or rather a control block (i.e., a block carrying control information sent by the network to the MS). The RRBP field 430, if active, is used by the network apparatuses to reserve a single data block in uplink in which the MS shall transmit a message of the type PACKET CONTROL ACKNOWLEDGMENT or PACKET DOWNLINK ACK/NACK to the network; the value in the RRBP field 430 specifies after how many radio data blocks a given MS (addressed by the network as described in the following) has to reply. The S/P field 435 is used to indicate to the MSs that a response is required by the network (this field indicates whether the content of the field RRBP is valid or not). The USF field 440 is normally used on the PDCH to allow multiplexing of radio blocks from a number of MSs, and enables the coding of eight different USF states which are used to multiplex the uplink traffic. According to current standards, the MAC header has a fixed, constant length of eight bits.

Differently, the RLC header 410 does not have a constant length, its length being variable depending on the number of Logic Link Control-Packet Data Units (LLC-PDUs) transported by the respective radio data block.

The RLC header 410 comprises, in addition to other fields per-se known and not relevant to the understanding of the invention embodiment being described, a field 445 (typically of five bits) containing the TFI labeling the specific radio data block 400, and one or more octets 450a, ..., 450n starting with a Length Indicator (LI) field 455 (of six bits) that defines the length of a corresponding LLC-PDU in the RLC data portion 415, a field Extension (E) 460 (of one bit), indicating whether there follows an additional octet 450a, ..., 450n in the RLC header 410, and a field More (M) 465 (of one bit as well) indicating the presence of a further LLC-PDU in the radio data block.

Figure 4B:
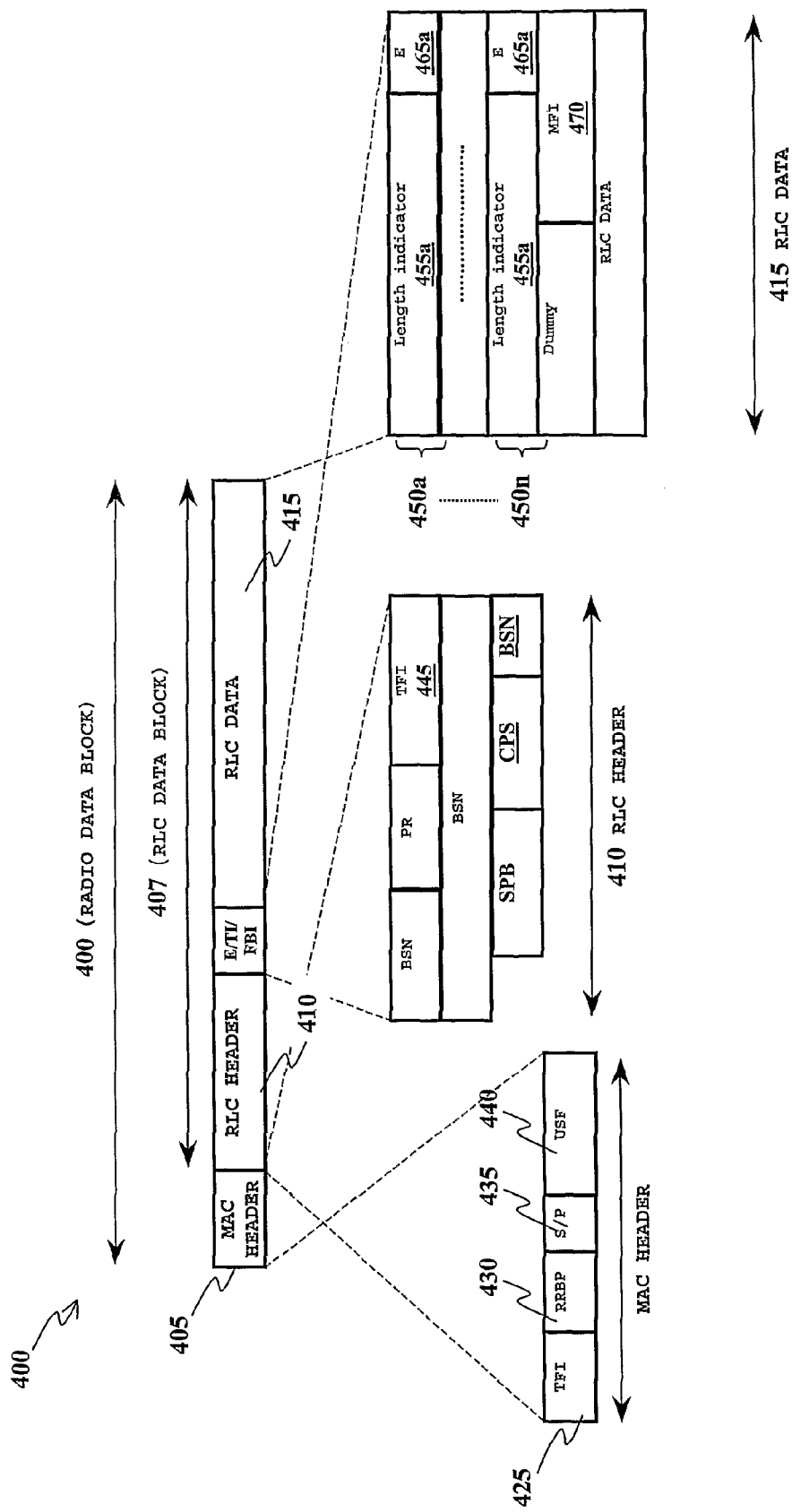
FIG. 4B shows a similar, exploded representation of the structure of a radio data block according to a EGRPS standard (for GMSK code schemes MCS1-MCS4)

It is observed that the above-described structure of the RLC header reflects the specifications for the current GPRS standard. In the current specifications for the Enhanced GPRS (EGPRS), also known as Enhanced Data rates for Global Evolution (EDGE), using the 8PSK modulation technique to increase the data rate over that typical of plain GPRS, the structure of the radio data block is slightly different. For example, in FIG. 4B an exploded view of a generic radio data block according to the EGPRS GMSK code schemes MCS1 to MCS4 is provided. In this case, the first field 425 of the MAC header 405 contains a part of the TFI (the remaining part being included in the field 445 of the RLC header 410) the RLC data portion 415 of the radio data block 400 includes octets 450a, ..., 450n each of which includes a seven-bit Length Indicator (LI) field 455a, and a one-bit field 465a, equivalent to the E field 465 of FIG. 4A. Similar structures may be found in the EGPRS GMSK code schemes MCS5 to MCS9.

According to an embodiment of the present invention, the additional identifier parameter of the BSC-MS logic connection assigned by the network apparatuses for individually addressing the MSs of a same multicast group and located in a same network cell, i.e. the MFI, can be formed by a number of bits equal to or higher than those necessary for the TFI, but roughly of the same order as the TFI, i.e. typically about five bits. In preferred embodiments, the MFI is formed by a number of bits from five to seven.

According to an embodiment of the present invention, the MFI is included in the RLC data portion 415 of a generic radio data block 400 transporting data related to the multicast service being distributed. In order to include the MFI, the RLC header of a radio data block is properly extended to obtain an extended RLC header. According to an embodiment of the present invention, the extension of the RLC header necessary for signaling to the MS that an MFI is included in the RLC header is accomplished by setting the LI field 455 in one of the octets 450a, ..., 450n, to a predetermined value, for example LI=55 in GPRS and LI=75 in EGPRS. The extended RLC header includes therefore an octet 450a, ..., 450n with the LI field set to the prescribed value, plus the MFI.

Concerning the way in which the MFI is assigned and communicated by the network to the MSs, preferred MFI assignment procedures are described in detail in the above mentioned document Tdoc GP-040877, which is herein incorporated by reference. The procedures disclosed in the above mentioned document Tdoc GP-040877 for assignment of the MFI advantageously allow the BSS to perform also a counting of the MSs, included in a given cell, that have requested the multicast service.

The provision of the parameter MFI in addition to the TFI gives rise to a global address parameter, or global identifier {TFI,MFI}, that allows the network apparatuses, namely the generic BSC, to address a specific MS among those involved in the multicast service "A" within a specific network cell. The possibility of individually addressing the MSs in a cell even if they belong to a same multicast group enables the network to implement an efficient multicast data retransmission policy based on the ACKnowledgment/uNACKnowledgement (ACK/NACK) of the received multicast data by the MSs.

Figure 5:
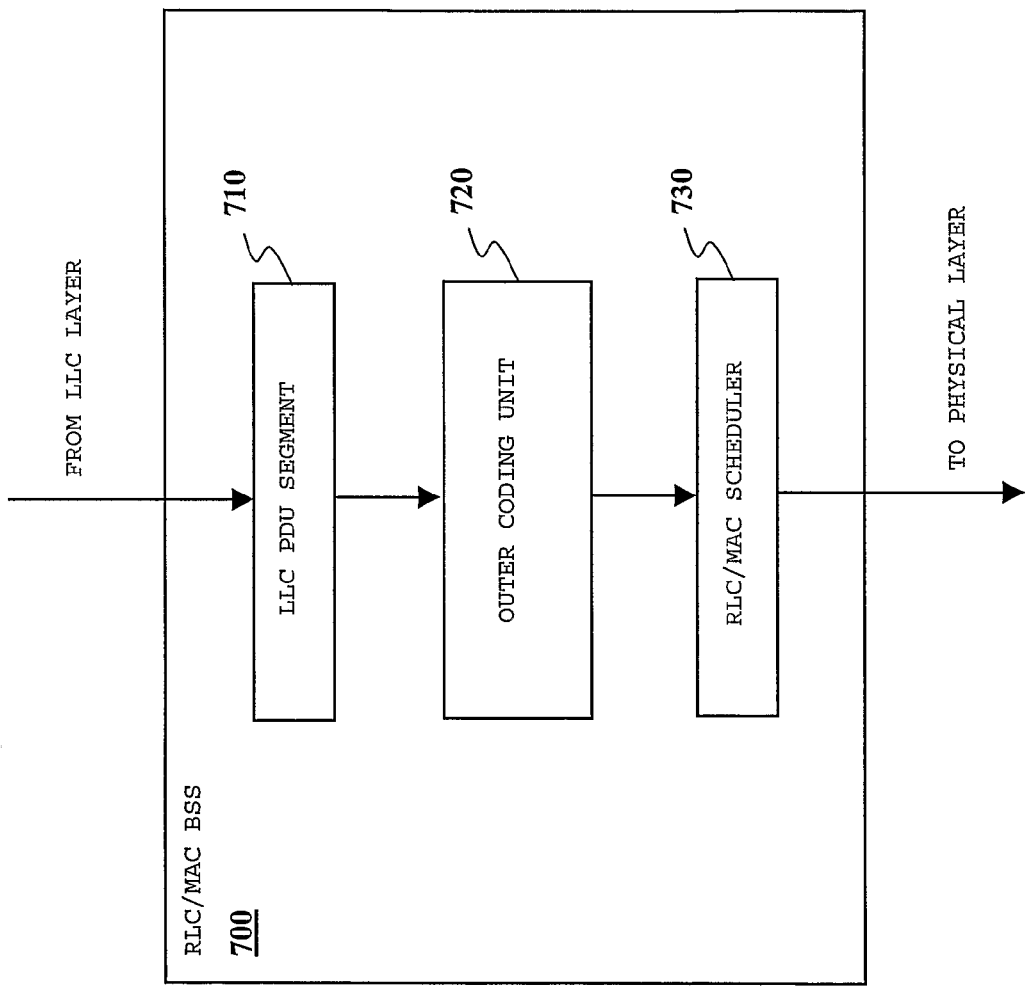
FIG. 5 shows, in schematic functional blocks sufficient for the purposes of the present invention, a preferred embodiment of a RLC/MAC level unit of a generic BSS being adapted to perform an outer coding of the RLC data blocks to be sent to the MSs.

According to the invention, an outer coding of the RLC data blocks related to the multicast service to be sent to the MSs is also performed at the BSS. FIG. 5 shows, with the aid of schematic functional blocks sufficient for the purposes of the present invention, a preferred embodiment of a RLC/MAC level unit 700 of a generic BSS being adapted to perform an outer coding of the RLC data blocks to be sent to the MSS.

With reference to FIG. 5, LLC PDU frames coming from an upper LLC layer, and carrying information content related to the multicast service, are split in segments in a LLC PDU segmentation unit 710. An outer coding unit 720 generates, starting from a sequence of k LLC segments, (n−k) parity blocks. The k LLC segments will be also referred, in the remainder of the description, to as k systematic data blocks. Well-known algorithms, such as a Reed-Solomon mother code, may be exploited for outer code encoding of the k systematic data blocks, in order to generate the (n−k) parity blocks. In preferred embodiments the outer code encoding process leaves unchanged the bit map of the k systematic data blocks. According to typical outer coding procedures, (n−k) parity blocks allow to reconstruct a sequence of k systematic blocks having at most (n−k) errors.

The sequence formed by the k systematic data blocks by and the (n−k) parity blocks is then forwarded to a RLC scheduler 730, that adds a header to both the systematic and parity blocks. Such a header includes, among other fields, a Block Sequence Number (BSN), the TFI set for the multicast transmission, and, possibly, a MFI among those assigned to MSs, in order to perform an ack/nack request. In preferred embodiments, the BSN may be assigned to the systematic and parity blocks according to the following rule:

the k systematic data blocks are assigned BSN=(M×n, ..., M×n+k−1)

the (n−k) parity blocks are assigned BSN=(M×n+k, ..., M×n+n−1)

wherein M is an integer number representing an outer code sequence number.

In other words, in a preferred embodiment the (n−k) parity blocks generated by the outer code encoding process are disposed sequentially after the k systematic blocks, in each sequence of blocks to be sent to the MSs requesting the multicast service. After outer code encoding and RLC scheduling, the RLC data blocks (both the systematic and the parity blocks) are forwarded to a physical layer of the BSS in order to allow over-the-air transmission of the same to the MSs.

The outer code parameters (n, k) may be communicated by the BSS to the MSs during negotiation of the data transmission parameters, before the beginning of the MBMS data transmission. Exemplary values of (n, k) for GPRS may be (68, 64), (72, 64), (80, 64), etc.

A preferred ACK/NACK-based retransmission procedure, combined with an outer coding of the transmitted RLC data blocks, according to an embodiment of the present invention, will now be explained in detail, with the aid of the schematic flowchart of FIG. 6.

Figure 7:
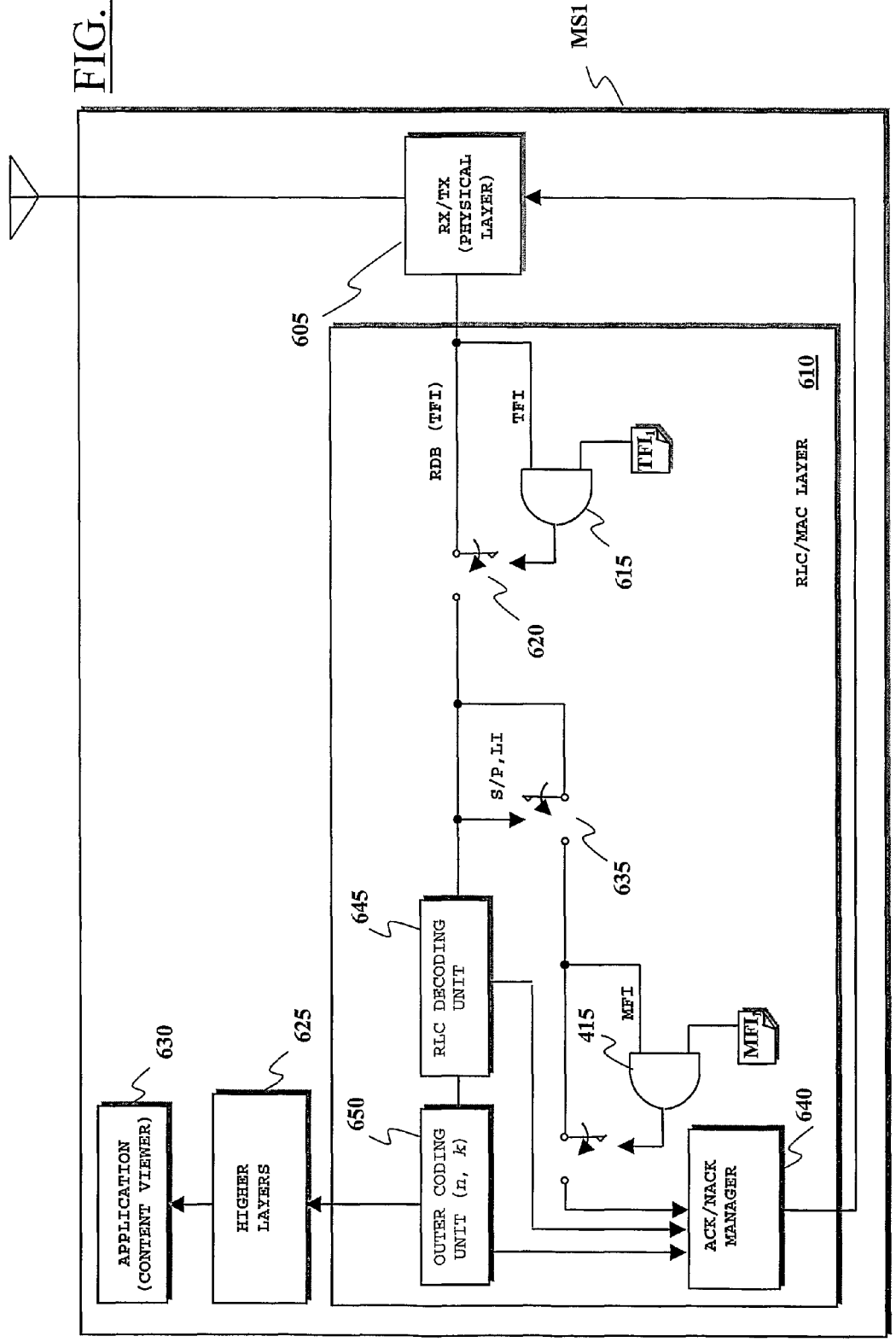
FIG. 7 schematically shows, in terms of functional blocks relevant to the understanding of the exemplary invention embodiment herein considered, a mobile station adapted to exploit a multicast GPRS service.

In order to better understand the ACK/NACK-based retransmission procedure, reference is made to FIG. 7, schematically showing, in an extremely simplified way and in terms of functional blocks relevant to the understanding of the exemplary invention embodiment herein considered, a generic MS such as the MS MS1. As known, an MS comprises, in addition to specific elements allowing radio communications, a programmable data processing unit, particularly a microprocessor, with dynamic and non-volatile memory resources. The data processing unit interacts with a Subscriber Identity Module (SIM), which is a removable smart-card module having its own data processing and storage capabilities. It is intended that at least some of the functions that will be described may be implemented in terms of software run by the data processing units of the MS and/or of the SIM.

The MS MS1 comprises a physical layer unit 605 handling the low-level (physical level) details of the radio communications, compliant to the GSM standard; this unit comprises in particular the transmitter/receiver circuits of the MS. The physical level unit 605 communicates with an RLC/MAC (Media Access Control) level unit 610, managing the communications at the immediately higher RLC/MAC level, particularly controlling the access of the MS to the physical communication medium. In extremely simplified terms, sufficient for the purposes of the present description, the RLC/MAC level unit 610 receives the radio data blocks from physical level unit 605, and reconstructs the various GPRS logic channels mentioned in the foregoing. In particular, the RLC/MAC level unit compares (as schematized by the AND logic gate 615) the TFI labeling the received radio data blocks to the locally-stored tuning TFI $TFI_1$, which the MS uses for establishing whether the radio data blocks are directed thereto, and are therefore to be captured and retained, or discarded. If the TFI labeling the received radio data blocks does not coincide with the tuning TFI $TFI_1$, the radio data blocks are discarded (as schematized by the switch 620 open), otherwise they are captured, the data traffic channel is reconstructed, and the data are passed over to the higher levels 625, up to the application layer.

The received data relating to the GPRS service are then passed to an application software 630, such as a content viewer or an MP3 player or the like and, through the proper I/O peripheral (display, loudspeaker, headphones), are made available to the user (alternatively, or in combination, the data may be stored in a local storage of the MS, for a background fruition).

In more detail, a RLC decoding unit 645 verifies if the incoming captured RLC data blocks (comprising both systematic data blocks and parity blocks that were labeled with the TFI $TFI_1$) were received correctly. For such purpose, a detection based on CRC control may be typically used. The RLC decoding unit 645 cooperates with an ACK/NACK manager 640, managing the ACK/NACK operations. If a data block was incorrectly received, a notification is sent by the RLC decoding unit 645 to the ACK/NACK manager 640, so that a flag is disposed corresponding to the BSN of the incorrectly received block, in the map of the received blocks.

The RLC decoding unit 645 then sequentially passes (according to the assigned BSN) the RLC data blocks (both the systematic and the parity ones) to a MS outer coding unit 650, dedicated to outer code decoding of the captured data blocks. The MS outer code unit 650 is configured to reassemble the original LLC segments, to be passed to the higher levels 625, from the sequence of the received k systematic and (n–k) parity blocks. In particular, only the k systematic blocks are used by the outer code unit 650 for reassembling the LLC segments, whereas the (n–k) parity blocks are used by the outer code unit 650 in order to recover systematic blocks possibly received with errors. If the outer coding unit 650 successfully recovers the k systematic data blocks of a sequence M, it empties its buffer and notifies the ACK/NACK manager 640 of the successful decoding of the block sequence number M. On the other hand, if the outer coding unit 650 does not succeed in recovering the k systematic data blocks of a sequence M, due to an excessive number of errors in the received systematic and/or parity blocks, it waits for the retransmission of the incorrectly received blocks by the BSS, after which it retries reassembling of the original LLC segments. The reassembled LLC segments are then passed to the higher levels 625.

As schematized by a switch 635, depending on whether or not the field S/P 435 (see FIG. 4A-4B) in a received radio data block is set, and the LI field 455 (or 455a) in one of the octets 450a, ..., 450n is set to one of the predetermined values (see below), the MFI is extracted from the received radio data block, and compared (as schematized by the AND logic gate 640) to a locally-stored, personal MFI $MFI_1$, received from the BSC. In case of matching, the MS MS1 understands that the network is requesting an ACK/NACK of the received data blocks. The ACK/NACK manager 640 then manages the ACK/NACK operations.

Figure 6:
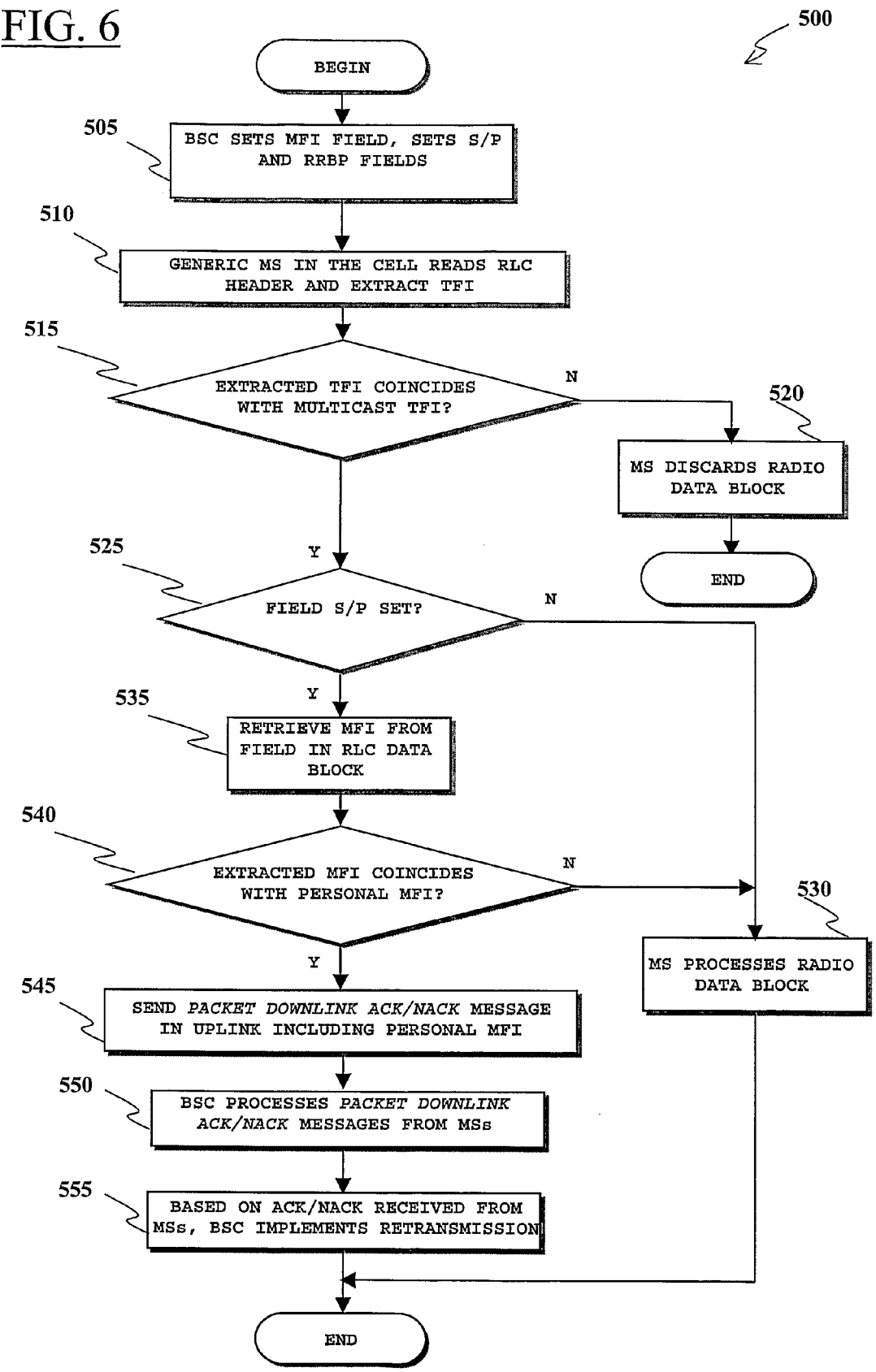
FIG. 6 is a schematic flowchart illustrating a MS-selective data receipt ack/nack scheme according to an embodiment of the present invention.

Back to the flowchart 500 of FIG. 6, let it now be assumed that the generic BSC of the network, for example the BSC BSC1, wants to address a specific one of the MSs under its control, which are located in a same cell and are at the time receiving identical information content via the multicast service, in the example herein considered one among the MSs MS1 and MS2 in the cell CELL1, e.g. the MS MS2, in respect of the service "A". The BSC BSC1 sets the LI field 455a (see FIGS. 4A-4B) in one of the octets 450a, ..., 450n within the RLC header 410 of a RLC/MAC block 400 sent on the downlink, to a predetermined value (e.g. LI=55 for GPRS or LI=75 for EGPRS), and sets the field MFI 470 with the desired MFI, corresponding to the MS to be addressed, retrieved from the table 145-1. Such a block 400 may be for example one of the radio data blocks delivering the data relating to the multicast service "A". Additionally, the BSC BSC1 sets the S/P field 435 and RRBP field 430 within the MAC header 405 of that RLC/MAC block 400. All these operations are schematized by action block 505 in the flowchart 500.

In this way, the BSS addresses the specific MS MS2, via the respective global identifier {TFI,MFI} in the radio data block RLC header 415, and instructs the addressed MS MS2 to send a PACKET DOWNLINK ACK/NACK message on the uplink to the BSC BSC1, at a time specified in the RRBP field 430.

The generic MS in the cell CELL1 reads the RLC header 410 of the radio data block 400 transmitted in the downlink, and extracts the TFI (block 510). The generic MS then checks whether the extracted TFI coincides with the one previously communicated thereto by the BSC (decision block 515).

In the negative case (exit branch N of decision block 515), the MS discards the radio data block (block 520).

In the affirmative case (exit branch Y of decision block 515) the MS checks (decision block 525) whether the S/P field 435 in the MAC header 405 is set, and the LI fields are set to the predetermined values (LI=55 for GPRS or LI=75 for EGPRS), indicating that the network is addressing a specific MS to request an ACK/NACK therefrom. In the negative case (exit branch N of decision block 525), the MS processes the received radio data block as usual, particularly for retrieving the RLC data (block 530). In the affirmative case (exit branch Y of decision block 525), the MS reads the field MFI 470 (the presence of which is signaled to the MS by the fact that the field LI in the RLC header stores the predetermined value 55 (GPRS) or 75 (EGPRS)), to retrieve the MFI value stored therein (block 535).

The MS then checks whether the retrieved MFI coincides with the stored MFI, previously communicated to the MS by the BSC (decision block 540). In the negative case, the MS processes the received radio data block as usual (block 530), otherwise (exit branch Y of decision block 540) the MS understands that it has been addressed by the network and requested to perform an ACK/NACK of the received data blocks.

The ACK/NACK manager 640 (see FIG. 7) of the MS MS2 addressed via the global identifier {TFI,MFI}, in the way described above, manages sending of the PACKET DOWNLINK ACK/NACK message in the uplink radio block period specified by the value in the RRBP field 430 (block 545). The MS may include its MFI in the PACKET DOWNLINK ACK/NACK message using part of the padding bits of the message, in order to let the BSC detect the correct identity of the responding MS. For example, the PACKET DOWNLINK ACK/NACK message may be sent to the BSC on the uplink PACCH, common to all the MSs involved in the MBMS session, which is the associated control channel associated with the downlink PDCH(s) used to deliver the multicast service to the MSs.

Figure 8:
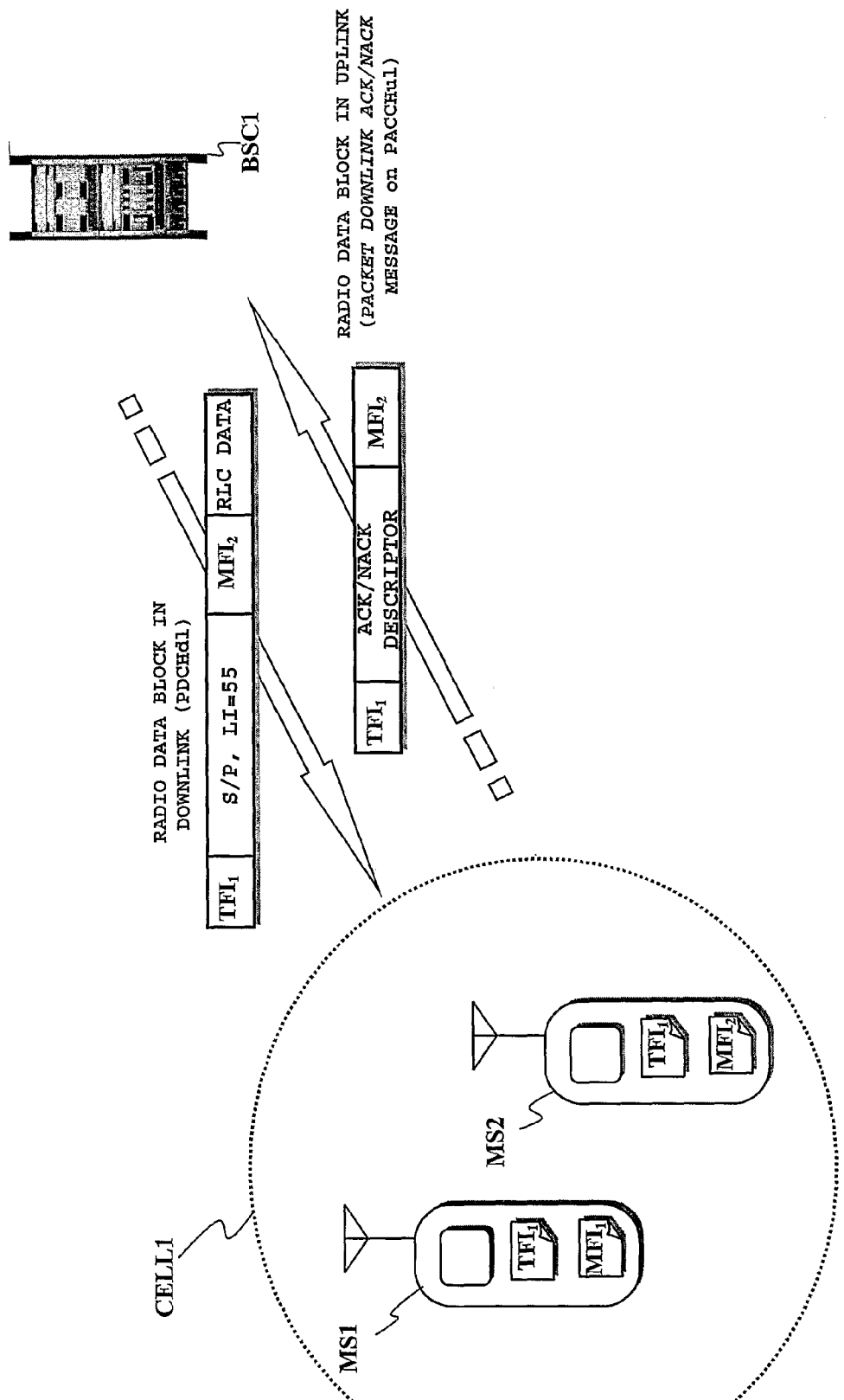
FIG. 8 is a pictorial representation of the MS-selective data receipt ack/nack scheme depicted in FIG. 5.

Without entering into details well known to the specialists, the PACKET DOWNLINK ACK/NACK message has a standard format and a predefined length (typically, 160 bit), and, among the other fields, includes the TFI of the sender MS, and an ACK/NACK description comprising a map of the received data blocks (the so-called Received Block Bitmap—RBB) useful to provide the BSC with an indication on the correct reception of the data blocks in a transmit window. The MS MS2 includes the personal MFI $MFI_2$ in the PACKET DOWNLINK ACK/NACK message; in this way, when the BSC BSC1 receives the message, it is capable (referring to the table 145-1) to assess the correct identity of the responding MS MS2 among those of the multicast group within the same cell CELL1, sharing the same TFI $TFI_1$. In particular, part of the so-called padding bits normally provided in the message (for achieving the predetermined message length of 160 bits) may be exploited to include the MFI in the PACKET DOWNLINK ACK/NACK message (as schematically depicted in FIG. 8).

A PACKET DOWNLINK ACK/NACK message may be also exploited in order to provide information to the BSS that k systematic blocks have been successfully recovered by the outer code decoding process performed by the outer coding unit 650, in spite of possible errors in the received data blocks. In practice, this corresponds to a "positive acknowledgement" of the outer code decoding process. For example, a K_SYSTEMATIC_BLOCKS_RECEIVED field may be set in the PACKET DOWNLINK ACK/NACK message, using part of the padding bits, including the sequence number of the correctly recovered sequence of k systematic blocks (represented with N bits, modulo $2^N$). The presence of such field may be denoted by setting an indicator bit, using a further padding bit of the message.

Back to flow-chart 500 of FIG. 6, the BSC BSC1 processes (block 550) all the PACKET DOWNLINK ACK/NACK messages received within a request period from all the MSs involved in a specific multicast service, and with an assigned individual MFI, in the example herein considered the MSs MS1 and MS2 as far as the cell CELL1 is concerned, in respect of service "A". A similar polling is performed on the MSs of other cells under the control of the BSC BSC1. Based on the ACK/NACK messages received from the MSs, the BSC implements a retransmission policy of the data blocks relating to the multicast service "A" to the MSs (block 555).

Several retransmission policies can be implemented by the BSC, the specific nature of the retransmission policy being per-se not limitative of the present invention.

In an exhaustive retransmission policy, all the radio data blocks referred to as not acknowledged (shortly, nacked) in the RBB of the ACK/NACK description in any received PACKET DOWNLINK ACK/NACK message, i.e. the radio data blocks incorrectly received by the MSs, are retransmitted. However, in such a case, the delay due to the high number of retransmissions could be remarkable In preferred embodiments, a selective retransmission approach is used, in which the retransmission is based on the overall number of nacked radio data blocks, in particular on a threshold T1 relevant to the percentage of MSs requesting the retransmission of a specific radio data block. Possibly, the MFIs of the MSs requesting the retransmissions may be also taken into account, for example in order to disable retransmission of data blocks only requested by MSs located in areas of a cell of poor coverage.

Depending on the chosen retransmission approach, retransmissions take place for RLC data blocks signaled as nacked by the MSs.

However, if the BSS detects a good number of positive acknowledgements related to a specific sequence of k systematic blocks recovered by a corresponding number of MSs, using the outer code decoding process, the BSS may stop retransmitting the remaining nacked data blocks of that sequence of k systematic blocks and (n−k) parity blocks. A specific threshold P1 may be set in order to decide if the retransmission of the nacked blocks relevant to a positively acknowledged sequence and of its corresponding nacked parity blocks has to be disabled or not.

Furthermore, when a selective retransmission approach is used, it may be also provided that, in case a good number of positive acknowledgements (for example higher than or equal to the threshold P1) is received, related to successful recovery of one or more sequences of data blocks by the outer coding process, the threshold T1 relevant to the percentage of MSs requesting the retransmission of a specific radio block, in order to get a data block actually retransmitted, be increased.

Advantageously, the addition of the outer coding allows a network operator to save bandwidth and transmission delays, since retransmission of nacked data blocks belonging to positively acknowledged block sequences may be strongly reduced, or even avoided, even if not all the RLC data blocks were correctly received by the MSs. Moreover, an increase in the selective retransmission approach threshold T1 implies a further reduction of the overall number of retransmitted RLC data blocks, and thus a further saving of transmission bandwidth.

On the other hand, a certain number of retransmissions may allow the provision of a setting of an outer coding procedure having a low impact on the transmission bandwidth. In particular, a low number of parity blocks can be used, since retransmissions may help the outer coding process when the incorrectly received data blocks are in excess with respect to the parity blocks used. This is of great advantage both for saving bandwidth, due to the low number of parity blocks used, and for keeping the complexity needed for performing the outer code encoding-decoding procedures (both at the BSS and, advantageously, at the MS) low.

In preferred embodiments, based on the overall number of nacked blocks signaled by the MSs, the BSS may modify the parameters of the outer code encoding-decoding process for the subsequent sequences. In particular, if it is understood from a high number of nacked radio blocks that the radio channel is particularly impaired, the number of parity blocks may be increased, reducing retransmission delays. On the contrary, if a low number of nacked radio blocks is signaled, a high percentage of which belonging to positively acknowledged sequences, the number of parity blocks may be decreased, thus saving bandwidth.

For example, when it is detected that a percentage of MSs requesting retransmission of a specific radio block is higher than a specified threshold T2 (that may be equal to, or preferably higher than, the threshold T1, in a selective retransmission approach), and this applies for a percentage of data blocks within the same sequence (e.g., a transmit window) higher than or equal to a specified threshold T3 (strongly impaired radio channel), the BSS may increase the number of parity blocks, e.g. from (n−k) to (n−k)'. Since the number k of systematic blocks (typically corresponding to a transmit window) may be left unchanged, this in practice may correspond to a change of the sole outer coding parameter n. The new parameter n' is then communicated to the MSs, in order to allow the same to correctly tune its outer coding unit 650 (see FIG. 7). In order to communicate the variation of the outer code parameters, the RLC header of a radio data block related to the multicast service may be properly extended to obtain an extended RLC header. According to an embodiment of the present invention, the extension of the RLC header necessary for signaling to the MS that outer code parameters are included in the extended RLC header of a number of consecutive RLC/MAC blocks may be accomplished by setting the LI field 455 (see FIG. 4A-4B) in one of the octets 450a, . . . , 450n, to a predetermined value, for example LI=60 in GPRS and LI=80 in EGPRS. The extended RLC header includes therefore an octet 450a, . . . , 450n with the LI field set to the prescribed value, plus the outer code parameters.

In an opposite example, when it is detected that a percentage of MSs requesting retransmission of a specific radio block is lower than a specified threshold T4 (that may be equal to, or preferably lower than, the threshold T1, in a selective retransmission approach), and this applies for a percentage of data blocks within the same sequence (e.g., a transmit window) higher than or equal to a specified threshold T5 (very good radio channel), the BSS may decrease the number of parity blocks, e.g. from (n−k) to (n−k)". In practice, corresponding to what said above, this may correspond to a decrease of the parameter n, to a lower number n". The new parameter n" is then communicated to the MSs, for example using the same procedure explained above. In order to increase reliability, the threshold T5, indicating that the number of parity blocks may be reduced, may be preferably higher than the threshold T3, indicating that the number of parity blocks should be increased.

Thanks to the invention embodiments described in the foregoing, GPRS service data can be distributed to, so as to be exploited by, a plurality of users at a same time, particularly users within the same cell of the cellular network, in a p-t-M modality (i.e., in multicast), and the network resources, particularly the physical radio resources, to be allocated are not directly dependent on the number of users simultaneously exploiting the GPRS services. This is of great benefit especially in case of GPRS services relatively heavy from the viewpoint of the quantity of data to be transferred, such as in GPRS services involving the distribution of multimedia (audio and/or video) contents.

The possibility offered by the combined provision of an acknowledged mode of transmission and of an outer coding process allows to improve the quality of service level, with limited bandwidth loss, limited radio transmission delays, and with a limited outer coding complexity required. It is noticed that any method allowing acknowledged radio transmission may be adopted for the purposes of the present invention. In particular, the methods for acknowledged transmission disclosed in the above mentioned documents Tdoc G2-040286 and Tdoc GP-040964 may be adapted for use in the procedures according to the present invention.

The solution according to the embodiment of the invention herein described has, furthermore, the significant advantage of not necessitating massive modifications of the standard GSM/GPRS apparatuses, already deployed on field.

Although the present invention has been disclosed and described by way of an embodiment, it is apparent to those skilled in the art that several modifications to the described embodiment, as well as other embodiments of the present invention are possible without departing from the scope thereof as defined in the appended claims.

The invention claimed is:

1. A method for distributing identical information content to a plurality of mobile stations located in a geographical area of a mobile network, comprising:
generating a first sequence of data blocks carrying said information content;
performing an outer code encoding of said first sequence of data blocks, so as to obtain a second sequence of data blocks;
transmitting the second sequence of data blocks to said mobile stations;
receiving from said mobile stations, negative acknowledgements related to at least one incorrectly received data block of said second sequence;
conditionally re-transmitting said at least one incorrectly received data block of said second sequence based on a number of said negative acknowledgements, wherein said conditionally re-transmitting comprises:
receiving, from said mobile stations, a number of positive acknowledgements related to a correct outer code decoding of said second sequence of data blocks; and
disabling re-transmission of said at least one incorrectly received data block of said second sequence upon reception of said number of positive acknowledgements; and
modifying parameters of said outer code encoding based on said number of said received negative acknowledgements,
wherein said modifying of the parameters of said outer code encoding comprises changing a number of parity blocks in subsequent sequences upon reception of a plurality of numbers of negative acknowledgements corresponding to a plurality of incorrectly received data blocks of said second sequence, each of said plurality of numbers of negative acknowledgements being compared to a first predetermined threshold.

2. The method of claim 1, wherein said second sequence comprises a number of data blocks higher than said first sequence.

3. The method of claim 1, wherein said conditionally re-transmitting comprises re-transmitting said at least one incorrectly received data block of said second sequence if said number of negative acknowledgements is higher than or equal to said first predetermined threshold.

4. The method of claim 1, wherein said disabling of re-transmission of said at least one incorrectly received data block of said second sequence is performed if said number of positive acknowledgements is higher than or equal to a second predetermined threshold.

5. The method of claim 3, further comprising increasing a value of said first predetermined threshold upon reception of said number of positive acknowledgements.

6. The method of claim 5, wherein said increasing of the number of parity blocks is carried out if each of said plurality of numbers of negative acknowledgements is higher than or equal to a third predetermined threshold, higher than said first predetermined threshold.

7. The method of claim 6, wherein said increasing of the number of parity blocks is carried out if a ratio between a number of incorrectly received data blocks of said second sequence and a number of data blocks of said second sequence is higher than or equal to a fourth predetermined threshold.

8. The method of claim 7, wherein said modifying of the parameters of said outer code encoding comprises decreasing the number of parity blocks in subsequent sequences upon reception of the plurality of numbers of negative acknowledgements corresponding to the plurality of incorrectly received data blocks of said second sequence, each of said plurality of numbers of negative acknowledgements being lower than said first predetermined threshold.

9. The method of claim 8, wherein said decreasing of the number of parity blocks is carried out if each of said plurality of numbers of negative acknowledgements is lower than a fifth predetermined threshold, higher than said first predetermined threshold.

10. The method of claim 9, wherein said decreasing of the number of parity blocks is carried out if a ratio between a number of incorrectly received data blocks of said second sequence and a number of data blocks of said second sequence is higher than or equal to a sixth predetermined threshold.

11. The method of claim 10, wherein said sixth predetermined threshold is higher than said fourth predetermined threshold.

12. The method of claim 1, wherein said geographical area comprises a cell of said mobile network.

13. A base station sub-system for a mobile network for distributing identical information content to a plurality of mobile stations located in a geographical area of the mobile network, wherein said base station sub-system performs steps comprising:
  generating a first sequence of data blocks carrying said information content;
  performing an outer code encoding of said first sequence of data blocks, so as to obtain a second sequence of data blocks;
  transmitting the second sequence of data blocks to said mobile stations;
  receiving from said mobile stations, negative acknowledgements related to at least one incorrectly received data block of said second sequence;
  conditionally re-transmitting said at least one incorrectly received data block of said second sequence based on a number of said negative acknowledgements, wherein said conditionally re-transmitting comprises:
    receiving from said mobile stations, a number of positive acknowledgements related to a correct outer code decoding of said second sequence of data blocks; and
    disabling re-transmission of said at least one incorrectly received data block of said second sequence upon reception of said number of positive acknowledgements; and
  modifying parameters of said outer code encoding based on said number of said received negative acknowledgements,
    wherein said modifying of the parameters of said outer code encoding comprises changing a number of parity blocks in subsequent sequences upon reception of a plurality of numbers of negative acknowledgements corresponding to a plurality of incorrectly received data blocks of said second sequence, each of said plurality of numbers of negative acknowledgements being compared to a first predetermined threshold.

14. The base station sub-system of claim 13, wherein said second sequence comprises a number of data blocks higher than said first sequence.

15. The base station sub-system of claim 13, wherein said conditionally re-transmitting comprises re-transmitting said at least one incorrectly received data block of said second sequence if said number of negative acknowledgements is greater than or equal to said first predetermined threshold.

16. The base station sub-system of claim 13, wherein said disabling of re-transmission of said at least one incorrectly received data block of said second sequence is performed if said number of positive acknowledgements is higher than or equal to a second predetermined threshold.

17. The base station sub-system of claim 15, wherein said base station sub-system further performs the step of:
  increasing a value of said first predetermined threshold upon reception of said number of positive acknowledgements.

18. The base station sub-system of claim 17, wherein said increasing of the number of parity blocks is carried out if each of said plurality of numbers of negative acknowledgements is higher than or equal to a third predetermined threshold, higher than said first predetermined threshold.

19. The base station sub-system of claim 18, wherein said increasing of the number of parity blocks is carried out if a ratio between a number of incorrectly received data blocks of said second sequence and a number of data blocks of said second sequence is higher than or equal to a fourth predetermined threshold.

20. The base station sub-system of claim 19, wherein said modifying of the parameters of said outer code encoding comprises decreasing the number of parity blocks in the subsequent sequences upon reception of the plurality of numbers of negative acknowledgements corresponding to the plurality of incorrectly received data blocks of said second sequence, each of said plurality of numbers of negative acknowledgements being lower than said first predetermined threshold.

21. The base station sub-system of claim 20, wherein said decreasing of the number of parity blocks is carried out if each of said plurality of numbers of negative acknowledgements is lower than a fifth predetermined threshold, higher than said first predetermined threshold.

22. The base station sub-system of claim 21, wherein said decreasing of the number of parity blocks is carried out if a ratio between a number of incorrectly received data blocks of said second sequence and a number of data blocks of said second sequence is higher than or equal to a sixth predetermined threshold.

23. The base station sub-system of claim 22, wherein said sixth predetermined threshold is higher than said fourth predetermined threshold.

24. The base station sub-system of claim 13, wherein said geographical area comprises a cell of said mobile network.

25. A mobile network comprising at least one base station sub-system according to claim 13.

26. The mobile network according to claim 25, further comprising a gateway GPRS support node associated with said base station sub-system and being connected to one or more packet data network.

27. The mobile network according to claim 26, further comprising a serving GPRS support node associated with said base station sub-system and with said gateway GPRS support node for routing packets received from said one or more packet data network toward said at least one base station sub-system.

* * * * *